United States Patent
Fuentes et al.

(10) Patent No.: US 12,534,686 B2
(45) Date of Patent: Jan. 27, 2026

(54) COOKTOP CLEANING FORMULATIONS

(71) Applicant: Reckitt & Colman (Overseas) Hygiene Home Limited, Slough (GB)

(72) Inventors: Heidi Fuentes, Montvale, NJ (US); Jonathan Nunez, Montvale, NJ (US); Bikramjit Singh, Montvale, NJ (US); Sahil Akolawala, Montvale, NJ (US); Kyle Robbins, Montvale, NJ (US)

(73) Assignee: Reckitt & Colman (Overseas) Hygiene Home Limited, Slough (GB)

( * ) Notice: Subject to any disclaimer, the term of this patent is extended or adjusted under 35 U.S.C. 154(b) by 177 days.

(21) Appl. No.: 18/455,822

(22) Filed: Aug. 25, 2023

(65) Prior Publication Data
US 2023/0399582 A1    Dec. 14, 2023

(51) Int. Cl.
| C11D 1/00 | (2006.01) |
| C11D 1/722 | (2006.01) |
| C11D 3/37 | (2006.01) |
| C11D 3/43 | (2006.01) |

(52) U.S. Cl.
CPC ............ *C11D 1/722* (2013.01); *C11D 3/3707* (2013.01); *C11D 3/3723* (2013.01); *C11D 3/373* (2013.01); *C11D 3/3761* (2013.01); *C11D 3/43* (2013.01); *C11D 2111/20* (2024.01)

(58) Field of Classification Search
None
See application file for complete search history.

(56) References Cited

U.S. PATENT DOCUMENTS

| 5,977,042 | A | 11/1999 | Hernandez et al. |
| 6,358,907 | B1 | 3/2002 | Vitomir |
| 6,492,317 | B1 | 12/2002 | Kerobo et al. |
| 6,683,036 | B2 | 1/2004 | Foley |
| 6,878,682 | B1 | 4/2005 | O'Lenick, Jr. |
| 6,906,022 | B1 | 6/2005 | Capeci et al. |
| 9,029,308 | B1 | 5/2015 | Koo et al. |
| 2002/0035051 | A1 | 3/2002 | Alam et al. |
| 2002/0039982 | A1 | 4/2002 | Foley et al. |
| 2002/0058603 | A1 | 5/2002 | Aszman et al. |
| 2002/0082185 | A1 | 6/2002 | Totoki |
| 2002/0123443 | A1 | 9/2002 | Bennie et al. |
| 2002/0169090 | A1 | 11/2002 | Foley et al. |
| 2003/0008801 | A1 | 1/2003 | Raths et al. |
| 2003/0027736 | A1 | 2/2003 | Raths et al. |
| 2003/0114345 | A1 | 6/2003 | Leonard et al. |
| 2003/0119689 | A1 | 6/2003 | Hutton et al. |
| 2003/0158448 | A1 | 8/2003 | Lassila |
| 2003/0199420 | A1 | 10/2003 | Tsumori et al. |
| 2004/0157763 | A1 | 8/2004 | Foley et al. |
| 2005/0003989 | A1 | 1/2005 | Noguchi et al. |
| 2005/0170991 | A1 | 8/2005 | Ruland et al. |
| 2005/0181967 | A1 | 8/2005 | Ruland et al. |
| 2005/0215452 | A1 | 9/2005 | Ruland et al. |
| 2005/0233925 | A1 | 10/2005 | Foley et al. |
| 2005/0272626 | A1 | 12/2005 | Wulff et al. |
| 2006/0046952 | A1 | 3/2006 | Collin et al. |
| 2006/0257281 | A1 | 11/2006 | Weide et al. |
| 2007/0065391 | A1 | 3/2007 | Klumpe et al. |
| 2007/0082836 | A1 | 4/2007 | Both et al. |
| 2007/0123447 | A1 | 5/2007 | Killeen et al. |
| 2008/0023047 | A1 | 1/2008 | Billton et al. |
| 2008/0039666 | A1 | 2/2008 | Grothe et al. |
| 2008/0139438 | A1 | 6/2008 | Boehme et al. |
| 2008/0167215 | A1 | 7/2008 | Bittner et al. |
| 2008/0221006 | A1* | 9/2008 | Heisig ...................... C11D 3/48 510/245 |
| 2009/0023820 | A1 | 1/2009 | Dailey et al. |
| 2009/0124523 | A1 | 5/2009 | Dol et al. |
| 2009/0197790 | A1 | 8/2009 | Sengupta et al. |
| 2009/0299005 | A1 | 12/2009 | Allgaier et al. |
| 2009/0305940 | A1 | 12/2009 | Schimmel et al. |
| 2010/0147172 | A1 | 6/2010 | McDonald et al. |
| 2010/0257676 | A1 | 10/2010 | Shamayeli et al. |
| 2010/0267844 | A1 | 10/2010 | Varineau et al. |
| 2010/0298526 | A1 | 11/2010 | Tsumori et al. |
| 2010/0317560 | A1 | 12/2010 | Ryther et al. |
| 2010/0323948 | A1 | 12/2010 | Alexandre et al. |
| 2011/0094044 | A1 | 4/2011 | Shamayeli et al. |
| 2011/0098492 | A1 | 4/2011 | Varineau et al. |
| 2011/0190187 | A1 | 8/2011 | Hawes, III et al. |
| 2011/0319669 | A1 | 12/2011 | Yu et al. |
| 2012/0090646 | A1 | 4/2012 | Tanaka et al. |
| 2012/0172271 | A1 | 7/2012 | Hubrig et al. |
| 2012/0208738 | A1 | 8/2012 | Nomura et al. |

(Continued)

FOREIGN PATENT DOCUMENTS

| DE | 102013217373 A1 | 3/2015 |
| EP | 2963101 A1 | 1/2016 |

(Continued)

OTHER PUBLICATIONS

Acusol 820 Polymer, DOW Safety Data Sheet; Dec. 16, 2019, pp. 1-11.
Acusol 820 Rheoloogy Modifier/Sytabilizer, DOW Technical Data Sheet, pp. 1-9.
Acusol 823 Rheology Modifier, DOW Technical Data Sheet, pp. 1-7.
Acusol Millennium ER Polymer, DOW Safety Data Sheet, Jul. 7, 2023, pp. 1-12.
Acusol Millennium ER, DOW Technical Data Sheet, pp. 1-3.
Acusol Pro Polymer Product Guide, "Next time, cleaning will take even less time with Acusol Pro Polymer", DOW, pp. 1-4.
Acusol Pro Hard Surface Care Polymer, DOW Technical Data Sheet, pp. 1-2.

(Continued)

*Primary Examiner* — Necholus Ogden, Jr.
(74) *Attorney, Agent, or Firm* — Norris McLaughlin, PA

(57) ABSTRACT

Cleaning formulations for hard surfaces are disclosed, particularly for cleaning hard surfaces stained with burnt-on food deposits such as frequently occur on stovetops, oven, and grill surfaces. Processes to manufacture the cleaning formulations, as well as methods for their use are also disclosed.

20 Claims, No Drawings

(56) References Cited

U.S. PATENT DOCUMENTS

| | | |
|---|---|---|
| 2012/0227766 A1 | 9/2012 | Hafer et al. |
| 2013/0181159 A1 | 7/2013 | Tsuchiya et al. |
| 2013/0189198 A1 | 7/2013 | Tamareselvy |
| 2013/0247308 A1 | 9/2013 | Duerrschmidt et al. |
| 2013/0274170 A1 | 10/2013 | Yuan-Huffman et al. |
| 2013/0345110 A1 | 12/2013 | Volont et al. |
| 2014/0005095 A1 | 1/2014 | Perdigon et al. |
| 2014/0080745 A1 | 3/2014 | Graf et al. |
| 2014/0196220 A1 | 7/2014 | Man et al. |
| 2014/0271519 A1 | 9/2014 | Schiebel et al. |
| 2014/0371331 A1 | 12/2014 | Hamamatsu et al. |
| 2015/0175936 A1 | 6/2015 | Kingma et al. |
| 2015/0237852 A1 | 8/2015 | Zhong et al. |
| 2015/0259622 A1 | 9/2015 | Bureiko et al. |
| 2015/0259627 A1 | 9/2015 | Bureiko et al. |
| 2016/0075675 A1 | 3/2016 | Morita et al. |
| 2016/0090564 A1 | 3/2016 | Loughnane et al. |
| 2016/0137957 A1 | 5/2016 | Durrschmidt et al. |
| 2016/0369206 A1 | 12/2016 | Crets et al. |
| 2017/0015944 A1 | 1/2017 | Dkidak et al. |
| 2017/0015946 A1 | 1/2017 | Dkidak et al. |
| 2017/0037339 A1 | 2/2017 | Hilarides et al. |
| 2017/0044471 A1 | 2/2017 | Coope-Epstein et al. |
| 2017/0096623 A1 | 4/2017 | Tollens et al. |
| 2017/0175042 A1 | 6/2017 | Ahirwal et al. |
| 2017/0218308 A1 | 8/2017 | Blondel et al. |
| 2017/0335254 A1 | 11/2017 | Man et al. |
| 2018/0119071 A1 | 5/2018 | Parsons et al. |
| 2018/0230404 A1 | 8/2018 | Roerdink Lander et al. |
| 2018/0320109 A1 | 11/2018 | Boutique et al. |
| 2018/0346847 A1 | 12/2018 | Fukuda et al. |
| 2019/0117530 A1 | 4/2019 | Kreutz et al. |
| 2019/0144781 A1 | 5/2019 | Daeschlein et al. |
| 2019/0201858 A1 | 7/2019 | Braden et al. |
| 2019/0230929 A1 | 8/2019 | Petkus |
| 2019/0233762 A1 | 8/2019 | Luo et al. |
| 2019/0233776 A1 | 8/2019 | Goncalves Rodrigues |
| 2019/0330563 A1 | 10/2019 | Man et al. |
| 2019/0330573 A1 | 10/2019 | Man et al. |
| 2019/0359907 A1 | 11/2019 | Bodet et al. |
| 2019/0359910 A1 | 11/2019 | Ahirwal et al. |
| 2020/0010780 A1 | 1/2020 | Munoz Carrillo et al. |
| 2020/0017802 A1 | 1/2020 | Thangaraj |
| 2020/0060268 A1 | 2/2020 | Kawamura et al. |
| 2020/0085717 A1 | 3/2020 | Tamareselvy et al. |
| 2020/0095520 A1 | 3/2020 | Saito et al. |
| 2020/0139323 A1 | 5/2020 | Raether et al. |
| 2020/0181538 A1 | 6/2020 | Kensicher et al. |
| 2020/0199490 A1 | 6/2020 | Rightmire et al. |
| 2020/0246245 A1 | 8/2020 | Benard et al. |
| 2021/0009925 A1 | 1/2021 | Emiru et al. |
| 2021/0032566 A1 | 2/2021 | Araki et al. |
| 2021/0039060 A1 | 2/2021 | Weerasooriya et al. |
| 2021/0102145 A1 | 4/2021 | Balliet et al. |
| 2021/0115359 A1 | 4/2021 | Nagano et al. |
| 2021/0139400 A1 | 5/2021 | Ku et al. |
| 2021/0139815 A1 | 5/2021 | Masters et al. |
| 2021/0147762 A1 | 5/2021 | Boers et al. |
| 2021/0155872 A1 | 5/2021 | Hozumi |
| 2021/0214652 A1 | 7/2021 | Dubs et al. |
| 2021/0269343 A1 | 9/2021 | Yan et al. |
| 2021/0277330 A1 | 9/2021 | Savaglio et al. |
| 2021/0284868 A1 | 9/2021 | Masuda et al. |
| 2021/0291132 A1 | 9/2021 | van Vliet et al. |
| 2021/0301220 A1 | 9/2021 | Hubig et al. |
| 2021/0403838 A1 | 12/2021 | Hunt, Jr. et al. |
| 2022/0056383 A1 | 2/2022 | Kinuta et al. |
| 2022/0089983 A1 | 3/2022 | Garbark et al. |
| 2022/0106246 A1 | 4/2022 | Stenger et al. |
| 2022/0154103 A1 | 5/2022 | Kieffer et al. |
| 2022/0162526 A1 | 5/2022 | Olson et al. |
| 2022/0204888 A1 | 6/2022 | Valdes Vergara et al. |
| 2022/0364024 A1 | 11/2022 | Peitersen et al. |
| 2022/0372411 A1 | 11/2022 | Ahirwal et al. |
| 2023/0016792 A1 | 1/2023 | Ahirwal et al. |
| 2023/0058960 A1 | 2/2023 | Cooney, Jr. et al. |
| 2023/0094741 A1 | 3/2023 | James et al. |
| 2023/0116790 A1 | 4/2023 | Dhawan et al. |
| 2023/0143002 A1 | 5/2023 | Ahirwal et al. |
| 2023/0203400 A1 | 6/2023 | Bauer et al. |
| 2023/0348816 A1 | 11/2023 | Bauer et al. |
| 2023/0407205 A1 | 12/2023 | Kamenoue et al. |

FOREIGN PATENT DOCUMENTS

| | | |
|---|---|---|
| EP | 3015538 A1 | 5/2016 |
| EP | 3144373 A1 | 3/2017 |
| EP | 3460033 A1 | 3/2019 |
| EP | 4253357 A1 | 10/2023 |
| GB | 1480639 A | 7/1977 |
| GB | 1480639 A | 7/1977 |
| WO | 2004085591 A1 | 10/2004 |
| WO | 2007009555 A1 | 1/2007 |
| WO | 2012160462 A1 | 11/2012 |
| WO | 2013107579 A1 | 7/2013 |
| WO | 2013117438 A1 | 11/2013 |
| WO | 2013186170 A1 | 12/2013 |
| WO | 2014161714 A1 | 10/2014 |
| WO | 2017011216 A1 | 1/2017 |
| WO | 2017162945 A1 | 9/2017 |
| WO | 2019108990 A1 | 6/2019 |
| WO | 2019045449 A1 | 9/2019 |
| WO | 2020018356 A1 | 1/2020 |
| WO | 2020127243 A1 | 6/2020 |
| WO | 2021074545 A1 | 4/2021 |
| WO | 2021074547 A1 | 4/2021 |
| WO | 2021148806 A1 | 7/2021 |
| WO | 2022123995 A1 | 6/2022 |
| WO | 2022219132 A1 | 10/2022 |

OTHER PUBLICATIONS

BioSoft LFS-04 Product Bulletin, Stepan, pp. 1-2.
BioSoft LFS-07 Product Bulletin, Stepan, pp. 1-2.
Dow Hard Surface Care Kit, Seek Together, PowerPoint Presentation, DOW, pp. 1-48.
Robert Magro, et al.; "Be clean, Look clean"; Stepan Alkoxylates, PowerPoint Presentation, Jun. 4, 2020, p. 1-31.
Triton HW-1000 Surfactant, Safety Data Sheet, Mar. 23, 2022, pp. 1-13.

* cited by examiner

COOKTOP CLEANING FORMULATIONS

TECHNICAL FIELD

Cleaning formulations for hard surfaces are disclosed, particularly for cleaning hard surfaces stained with burnt-on food deposits such as frequently occur on stovetop, oven, or grill surfaces. Processes to manufacture the cleaning formulations, as well as methods for their use are also disclosed.

BACKGROUND

The prior art has proposed many compositions that allegedly remove food deposits burnt upon hard surfaces, such as are typically encountered on stovetops and oven surfaces.

In its Acusol™ Pro Polymer Product Guide, Dow proposed a grease fighter kitchen cleaner formulation consisting of 92.9% deionized water, 1% propylene glycol phenyl ether, 2% Ecosurf™ EH-14 surfactant (90%), 0.5% monoisopropanolamine, 1.5% diisopropanolamine, 2% Acusol™ Pro Polymer (25%), and 0.1% fragrance.

U.S. Pat. No. 6,683,036 to Procter & Gamble discloses a hard surface cleaning composition for removing cooked-, baked-, or burnt-on soils from cookware and tableware. The composition comprises an organoamine solvent. The composition has a liquid surface tension of less than about 24.5 mN/m and a pH, as measured in a 10% solution in distilled water, of less than 10.5. PCT Publication WO2012/160462 to Ecolab USA Inc discloses a non-corrosive degreasing concentrate and ready to use formulation.

PCT Publication WO 2017/011216 to Procter & Gamble discloses that glycol ether solvents may be used in liquid cleaning compositions to improve the removal of hydrophobic stains from hard surfaces, and also improve the sudsing profile of the composition. PCT Publication WO2019/108990 to Ecolab USA Inc. discloses cleaning compositions and methods of use thereof for cleaning fryers and other hard surfaces soiled by grease, shortening, oils, and other soils commonly countered in the food service industry.

GB Publication 1480639 to Bristol-Myers Company discloses oven cleaning compositions having low caustic concentration and yet a cleaning capability equal to conventional high caustic oven cleaners.

PCT Publication WO 2020/018356 to Stepan discloses dilutable concentrates useful for hard surface cleaners with improved film/streak performance on high-energy surfaces.

PCT Publication WO 2021/148806 to Reckitt & Colman (Overseas) Hygiene Home Ltd discloses oven cleaning compositions and methods of making and using the same.

Notwithstanding the existence of the foregoing compositions, each of which provides some degree of benefit, there remains a real and pressing need for improvements in hard surface cleaning compositions effective in the removal of burnt-on food deposits which adhere to their surfaces. Particularly a need remains for hard surface cleaning compositions which are effective in the removal of burnt-on food deposits from stovetop, oven, and grill surfaces, and especially where said compositions are effective at ambient temperature.

It is to these and other objects that the present invention is directed.

SUMMARY OF INVENTION

Non-caustic hard surface cleaning formulations are disclosed which are effective in the removal of burnt-on food deposits from stovetop, oven, and grill surfaces. The formulations are effective at ambient temperature. The surfaces include those commonly encountered in cooking appliances, such as a glass, ceramic glass, porcelain, metal, and/or enameled metal surfaces, such as stainless steel and cast iron.

In a further aspect, there is provided a method of forming these said hard surface cleaning formulations. The method includes: combining measured amounts of the constituents and mixing the same in order to form a homogenous mixture therefrom.

In a yet further aspect there is provided a method for the removal of burnt-on food deposits from stovetop, oven, and grill surfaces, at or at about ambient temperature and/or at higher temperatures. The method includes applying a cleaning effective amount of the formulation onto a hardened food deposit on a surface and allowing the formulation to remain in contact with the baked food deposit for sufficient time whereby at least a part of the baked food deposit is released from the surface on which it is present. The non-caustic formulation may be applied and the food deposit wiped from the surface without the need for personal protective equipment, such as gloves or goggles.

These and further aspects of the invention are disclosed in the following.

Terms and Definitions

As used herein:
the symbol "~" and the terms "approximately" and "about" mean plus or minus 10% of the value stated;
the term "a" or "an" means one or more;
any and all ranges are inclusive of their endpoints, e.g., ranging from 1 wt % to 10 wt % includes 1 wt % and 10 wt % and any concentration between 1 wt % and 10 wt %;
all amounts given in % are % by weight (wt % or w/w) unless otherwise stated. The formulation comprising 1% wt raw material would mean that the raw material makes up 1% wt of the formulation. When a raw material does not contain close or equal to 100% active material, two percentages may be provided: one for the weight of the raw material and one for the weight of the active. For example, the formulation comprises 1.75% wt of the thickener Acusol™ 820 contains approximately 30% w/w of a Hydrophobically-modified Alkali Soluble Emulsion (HASE) polymer in water, which equates to a formulation comprising approximately 0.525% wt of the HASE polymer (i.e., 30% of 1.75=0.525) and 1.225% wt water (i.e., 70% balance× 1.75=1.225). This may also be represented as 1.75% wt (0.525% wt) of Acusol™ 820 HASE polymer;
the term "benzyl group" is $C_6H_5CH_2$—;
the abbreviation AO refers to a repeating alkoxy group represented by the formula —(O—$C_nH_{2n}$)—, wherein n=1-6, preferably 1-4;
the abbreviation EO refers to a repeating ethoxy group, also known as an ethylene oxide or oxirane group, represented by the formula —(O—$CH_2$—$CH_2$)—;
the abbreviation PO refers to a repeating propoxy group, also known as an propylene oxide or methyl oxirane group, represented by the formula —(O—$CH_2$—$CH_2$—$CH_2$)— or (O—$CH_2$—$CH(CH_3)$—);
the abbreviation BO refers to a repeating alkoxy group represented by the formula —(O—$C_4H_8$)—;
the term "comprising" is inclusive or open-ended and does not exclude any additional elements;
the term "consisting of" excludes any additional elements;

the term "consisting essentially of" is in-between, only permitting additional elements that do not materially affect characteristics of the product or process;

the phrase "substantially free" means a concentration of less than 0.3% wt, preferably less than 0.2% wt, more preferably less than 0.1% wt, and most preferably less than 0.05% wt;

the term "liquid" means a state of matter that conforms to the shape of the container in which it is held at ambient temperature (18-28° C.) and which acquires a defined surface in the presence of gravity; the term "liquid" is readily distinguishable from the terms "solid" and "gas." Liquids are not pastes, which behaves as a solid until a sufficiently large load or stress is applied, even though a paste is also known as a Bingham plastic fluid;

the term "gel" means a semi-solid state of matter that exhibits no flow when in steady-state or, according to IUPAC, a nonfluid colloidal network or polymer network that is expanded throughout its whole volume by a fluid;

the term "ambient temperature" means room temperature which may vary depending on the season from approximately 18° C. to approximately 28° C., but preferably from approximately 20° C. to approximately 25° C.;

the term "caustic" means a chemical or formulation that burns or corrodes organic tissue by chemical action;

the term "corrosive" means a chemical or formulation that produces destruction of skin tissue, namely, visible necrosis through the epidermis and into the dermis;

the term "hard surface" means a non-porous inanimate surface.

DETAILED DESCRIPTION

Hard surface cleaning formulations effective in the removal of burnt-on food deposits from stovetop, oven, and grill surfaces are disclosed. The formulations are effective on burnt-on food deposits at ambient temperature without the need for abrasives, such as diatomaceous earth, sodium metasilicate, sodium silicate, sodium bicarbonate, silica, or any combinations thereof. The non-caustic cleaning formulations comprise a carboxylic copolymer, a nonionic alkoxylated surfactant, a polyetheramine, water, and an organic solvent comprising an alkanolamine, dipropylene glycol n-propyl ether, and benzyl alcohol.

The carboxylic copolymer removes grease without leaving visual residue. The carboxylic polymer also deposits a transparent residual polymer that provides easier subsequent cleaning. The disclosed formulations comprise approximately 0.25% wt to approximately wt of the carboxylic copolymer, preferably approximately 0.25% wt to approximately wt, and more preferably approximately 0.25% wt to approximately 0.5% wt. The carboxylic copolymer is preferably an anionic, water-soluble copolymer having an average molecular weight ranging from 5,000 to 15,000, preferably from 7,500 to 12,500. One exemplary commercial source of the disclosed anionic, water-soluble carboxylic copolymer is sold as a 25% w/w mixture in water from Dow under the trade name Acusol™ Pro. As a result, the disclosed cleaning formulations comprise approximately 1% wt to approximately 3% wt of the 25% w/w mixture of the anionic, water-soluble carboxylic copolymer in water sold by Dow under the trade name Acusol™ Pro, preferably approximately 1% wt to approximately 2.5% wt, and more preferably approximately 1% wt to approximately 2% wt.

The nonionic alkoxylated surfactant also helps remove grease from the hard surface. The nonionic alkoxylated surfactant may be linear, branched, or comprise a mixture of both. The disclosed formulations comprise approximately 0.075% wt to approximately 1.33% wt of the linear and/or branched nonionic alkoxylated surfactant, preferably approximately 0.075% wt to approximately 0.95% wt, and more preferably approximately 0.075% wt to approximately 0.6% wt. The nonionic alkoxylated surfactant may be selected from a C8-14 linear alcohol ethoxylate with 1-20 EO, a C9-11 branched alcohol ethoxylate with 5-7 EO, or combinations thereof. The nonionic alkoxylated surfactant may be selected from a C8-14 linear alcohol ethoxylate with 2-10 EO, a C9-11 branched alcohol ethoxylate with 5-7 EO, or combinations thereof. The nonionic alkoxylated surfactant may be selected from a C12-15 linear alcohol ethoxylate with 6-8 EO, a C9-11 branched alcohol ethoxylate with 5-7 EO, or combinations thereof. Suitable commercial sources of these nonionic alkoxylated surfactants exist. For example, Stepan sells a C11 branched alcohol ethoxylate with 5-7 EO sold under the tradename Makon™ UD-6. In another example, Stepan sells a C12-15 linear alcohol ethoxylate with 6-8 EO under the tradename BioSoft™ N25-7.

The polyetheramine helps minimize streaking by the disclosed formulations. The disclosed formulations comprise approximately 0.004% wt to approximately 0.4% wt polyetheramine, preferably approximately 0.004% wt to approximately 0.3% wt, and more preferably approximately 0.004% wt to approximately 0.2% wt. The polyetheramine comprises at least one primary amine group (i.e., R—NH$_2$, wherein R is a hydrocarbon, such as a hydrocarbon or aromatic group). The polyetheramine has a number average molecular weight within the range of 300 to 5,000 g/mol and at least 50 mole % of oxypropylene units, oxybutylene units, or both. Suitable polyetheramines include polyoxypropylenetriamine having a number-average molecular weight of 300 to 2,000 g/mol, preferably from 300 to 1,000 g/mol. Exemplary polyoxypropylenetriamines suitable for use herein are commercially available from Huntsamn under the tradename Jeffamine™ T-403.

Alternatively, combinations of the nonionic alkoxylated surfactant and the polyetheramine are commercially available from Stepan under the trade name BioSoft™ LFS. The BioSoft™ LFS combination comprises 25-95% wt nonionic alkoxylated surfactant and 2-30% wt polyetheramine, preferably 80-95% wt nonionic alkoxylated surfactant and 5-20% wt polyetheramine. As a result, the disclosed cleaning formulations comprise approximately 0.3% wt to approximately 1.4% wt of the combination of the nonionic alkoxylated surfactant and polyetheramine sold by Stepan under the tradename BioSoft™ LFS, preferably approximately 0.3% wt to approximately 1% wt, and more preferably approximately 0.3% wt to approximately 0.6% wt. In one alternative, the disclosed cleaning formulations comprise approximately 0.2% wt to approximately 0.8% wt of the combination of the nonionic alkoxylated surfactant and polyetheramine sold by Stepan under the tradename BioSoft™ LFS-04, preferably approximately 0.2% wt to approximately 0.6% wt, and more preferably approximately 0.2% wt to approximately 0.4% wt. In another alternative, the disclosed cleaning formulations comprise approximately 0.1% wt to approximately 0.6% wt of the combination of the nonionic alkoxylated surfactant and polyetheramine sold by Stepan under the tradename BioSoft™ LFS-07, preferably approximately 0.1% wt to approximately 0.4% wt, and more preferably approximately 0.1% wt to approximately 0.2% wt. In yet another alternative, the disclosed cleaning formulations comprise approximately 0.2% wt to approximately 0.8% wt of the combination of the nonionic alkoxylated surfactant and polyetheramine sold by Stepan under the tradename BioSoft™ LFS-04 and approximately 0.1% wt to approximately 0.6% wt of the combination of the nonionic alkoxylated surfactant and polyetheramine sold by Stepan under the tradename BioSoft™ LFS-07. In yet another alternative, the disclosed cleaning formulations comprise approximately 0.2% wt to approximately 0.6% wt of the combination of the nonionic alkoxylated surfactant and polyetheramine sold by Stepan under the tradename BioSoft™ LFS-04 and approximately 0.1% wt to approximately 0.4% wt of the combination of the nonionic alkoxylated surfactant and polyetheramine sold by Stepan under the tradename BioSoft™ LFS-07. In yet another alternative, the disclosed cleaning formulations comprise approximately 0.2% wt to approximately 0.4% wt of the combination of the nonionic alkoxylated surfactant and polyetheramine sold by Stepan under the tradename BioSoft™ LFS-04 and approximately 0.1% wt to approximately 0.2% wt of the combination of the nonionic alkoxylated surfactant and polyetheramine sold by Stepan under the tradename BioSoft™ LFS-07.

The disclosed formulations contain organic solvents that provide superior grease and burnt-on food deposit cleaning efficacy while remaining below the limits of any volatile organic content (VOC) regulations. In WO2021/148806 to Reckitt & Colman (Overseas) Hygiene Home Limited, Applicant discovered that the synergistic combination of benzyl alcohol and dipropylene glycol n-propyl ether provided superior removal of burnt-on deposits from stovetop and oven surfaces, even at ambient temperatures, as compared to other organic solvents, or binary or ternary systems of organic solvents which do not include both benzyl alcohol and dipropylene glycol n-propyl ether. The compositions disclosed in WO2021/148806 comprise approximately 4.5% wt to approximately 25% wt of the binary benzyl alcohol/dipropylene glycol n-propyl ether system. Applicants have now discovered that formulations containing approximately 2% wt to approximately 6% wt, preferably approximately 2% wt to approximately 4% wt, and more preferably approximately 2% wt to approximately 3% wt, of a mixture of organic solvents still provide effective removal of burnt-on food deposits from stovetop, oven, and grill surfaces.

The organic solvent comprises approximately 25% wt to approximately 31% wt dipropylene glycol n-propyl ether, preferably approximately 25% wt. The disclosed formulations comprise approximately 0.5% wt to approximately 2% wt dipropylene glycol n-propyl ether, preferably approximately 0.5% wt to approximately 1% wt, more preferably approximately 0.5% wt to approximately 0.75% wt. The disclosed formulations do not contain any other glycol ethers.

The organic solvent comprises approximately 25% wt to approximately 31% wt benzyl alcohol, preferably approximately 25% wt. The disclosed formulations comprise approximately wt to approximately 2% wt benzyl alcohol, preferably approximately 0.5% wt to approximately 1% wt, and more preferably approximately 0.5% wt to approximately 0.75% wt. Applicants were surprised to discover that the combination of benzyl alcohol and dipropylene glycol n-propyl ether at these concentrations still penetrate grease and polymer films quickly.

The organic solvent comprises approximately 38% wt to approximately 50% wt alkanolamine, preferably approximately 50% wt. The disclosed formulations comprise approximately 0.975% wt to approximately 2.5% wt alkanolamine, preferably approximately 0.975% wt to approximately 2% wt alkanolamine, and more preferably approximately 0.975% wt to approximately 1.5% wt. The alkanolamine is preferably a combination of monoisopropanolamine and diisopropanolamine. One of ordinary skill in the art will recognize that the combination of monoisopropanolamine and diisopropanolamine provide sensory challenges to the formulation due to their smell. The low concentrations of these solvents help avoid this issue. The organic solvent comprises approximately 25% wt monoisopropanolamine. The disclosed formulations comprise approximately 0.475% wt to approximately 0.5% wt monoisopropanolamine. One of ordinary skill in the art will recognize that the State of California VOC limits prohibit concentrations of monoisopropanolamine in excess of 0.5% wt. While diisopropanolamine alone is not as effective a grease remover as monoisopropanolamine alone, the combination of diisopropanolamine and monoisopropanolamine provide superior grease cleaning results than either alone and meet the strict California VOC limits. The organic solvent comprises approximately 30% wt to approximately 50% wt diisopropanolamine, preferably approximately 33% wt to approximately 38% wt. The disclosed formulations comprise approximately 0.5% wt to approximately 2% wt diisopropanolamine, preferably approximately 0.5% wt to approximately 1.5% wt, and more preferably approximately 0.5% wt to approximately 1% wt.

As shown in the examples that follow, formulations containing the combination of dipropylene glycol n-propyl ether, benzyl alcohol, and monoisopropanolamine provides superior grease cleaning efficacy as compared to formulations containing a combination of dipropylene glycol phenyl ether and monoisopropanolamine. As a result, the disclosed formulations are substantially free of dipropylene glycol phenyl ether and other glycol ethers. The disclosed formulations are also substantially free of monoethanolamine.

The disclosed formulations are aqueous in nature and comprise approximately 85% wt to approximately 95% wt water, preferably approximately 90% wt to approximately 95% wt, and more preferably approximately 92% wt to approximately 95% wt. The water may be tap water, but is preferably distilled and is most preferably deionized water. If the water is tap water, it is preferably substantially free of any undesirable impurities, such as organics or inorganics. Any mineral salts which are present in hard water may undesirably interfere with the operation of the constituents present in the formulations according to the invention. The water is preferably soft deionized water, comprising less than 17 parts per million (ppm) calcium and less than 17 ppm magnesium.

The disclosed formulations have a water-like viscosity, approximately 1.0016 mPa at 20° C. The disclosed formulations have a pH of approximately 10 to approximately 11 at 20° C.

For aesthetic purposes, a thickener may optionally be included in the disclosed formulations. The thickener may be a polysaccharide or a polymer. A sufficient amount of thickener is added to produce a gel formulation having a viscosity ranging from approximately 400 cps to approximately 1000 cps at 20° C. as measured using spindle RV2 at 30 RPM. The gel formulation permits controlled dosage of the disclosed formulations. Consumers may apply too much liquid formulation without the added thickener.

Suitable polysaccharides include galactomannans, such as guar gum or xantham gum.

Suitable polymers include acrylic polymers, preferably anionic copolymers based on ethyl acrylate and acrylic acid. The polymer has a molecular weight of approximately 50,000 g/mol to approximately 500,000 g/mol, preferably approximately 80,000 g/mol to approximately 400,000 g/mol, and more preferably approximately 100,000 g/mol to approximately 300,000 g/mol. The disclosed formulations comprise approximately 0% wt to approximately 0.9% wt of the anionic copolymer, preferably approximately 0.3% wt to approximately 0.6% wt, and more preferably approximately 0.45% wt to approximately 0.6% wt. Particularly preferred anionic copolymers are Hydrophobically-modified Alkali Soluble Emulsion (HASE) polymer having the following chemical structure:

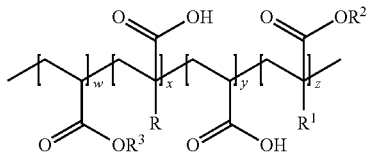

wherein each of R, $R^1$, and $R^3$ is independently H or a $C_1$-$C_6$ alkyl group; $R^2$ is a hydrophobic group, such as a $C_4$-$C_{24}$ alkyl group; and w, x, y, and z are each independently non-zero numbers. Preferably each of R, $R^1$, and $R^3$ is independently selected from H or a $C_1$ to $C_2$ alkyl group and $R^2$ is a $C_8$ to $C_{20}$ alkyl group. $R^2$ may further comprise alkoxylate (AO) units, preferably 1 to 60 AO units, and more preferably 10 to 50 AO units. The AO units may be ethoxy units (EO), propoxy units (PO), butoxy units (BO), or any combination thereof, preferably EO and/or PO, more preferably EO. The ratio of w:x is from 1:20 to 20:1, preferably from 1:10 to 10:1, more preferably from 1:5 to 5:1. The ratio of w:y is from 1:20 to 20:1, preferably from 1:10 to 10:1, more preferably from 1:5 to 5:1. The ratio of w:z is from 1:1 to 500:1, preferably from 2:1 to 250:1, more preferably from 25:1 to 75:1. The HASE acrylic polymer has a molecular weight of approximately 50,000 g/mol to approximately 500,000 g/mol, preferably approximately 80,000 g/mol to approximately 400,000 g/mol, and more preferably approximately 100,000 g/mol to approximately 300,000 g/mol. Exemplary commercial sources of the HASE acrylic polymer include the approximately 30-31% w/w dispersions in water from Dow under the trade names Acusol™ 820, Acusol™ 823, Acusol™ Millennium ER, or combinations thereof. As a result, the disclosed formulations comprise approximately 0% wt to approximately 3% wt of the 30-31% w/w dispersion of the HASE acrylic polymer in water sold by Dow under the trade names Acusol™ 820, Acusol™ 823, Acusol™ Millennium ER, or combinations thereof; preferably approximately 1% wt to approximately 2% wt, and more preferably approximately 1.5% wt to approximately 2% wt.

When the disclosed formulations include a thickener, an alkali base may also be added to thicken the polymer. The disclosed formulations may comprise approximately 0% wt to approximately 0.4% wt alkali hydroxide, preferably approximately 0.05% wt to approximately 0.2% wt, and more preferably approximately 0.05% wt to approximately 0.1% wt. A particularly preferred alkali hydroxide is sodium hydroxide or potassium hydroxide. One of ordinary skill in the art will recognize that sodium hydroxide is a highly caustic base. The minimum concentration of the alkali hydroxide is used in the disclosed formulation to prevent the need to use gloves during use of the disclosed formulations. The disclosed formulations may comprise approximately 0% wt to approximately 0.4% wt sodium hydroxide, preferably approximately 0.05% wt to approximately 0.2% wt, and more preferably approximately 0.05% wt to approximately 0.1% wt. The low concentration of alkali hydroxide also has minimum impact on the pH of the disclosed formulation. When the disclosed formulations include the optional thickener and alkali base, the disclosed formulations have a pH of approximately 10.5 to approximately 11 at 20° C.

The disclosed formulations may optionally include a wetting agent. The wetting agent may be a secondary alcohol ethoxylate or a polyether-modified polysiloxane. The optional wetting agent provides added shined to the cleaned surface. The formulation comprises approximately 0% wt to approximately 2% wt of a secondary alcohol ethoxylate, preferably approximately 0.1% wt to approximately 1% wt, and more preferably approximately 0.25% wt to approximately 0.5% wt. One preferred secondary alcohol ethoxylate has the Chemical Abstract Service (CAS) number 60828-78-6 and is known as 2-(2,6,8-trimethylnonan-4-yloxy)ethanol, polyethylene glycol mono(3,5-dimethyl-1-isobutylhexyl) ether, or polyethylene glycol trimethylnonyl ether. One commercially available source of polyethylene glycol trimethylnonyl ether is sold by Dow under the tradename Triton™ HW-1000. Alternatively, the disclosed formulations may comprise a polyether-modified polysiloxane sold by BASF under the tradename Hydroplat™ WE 3225.

The disclosed formulations may optionally include a linear C10-14 alkyl dimethyl amine oxide, preferably lauryl dimethyl amine oxide. The optional linear C10-14 alkyl dimethyl amine oxide may be added to help solubilize fragrance ingredients. However, the minimum concentration should be used due to the foam generating characteristics of this surfactant. Foam is not a desired quality of the disclosed formulations. The disclosed formulations comprise approximately 0% wt to approximately 2% wt of a linear C10-C14 alkyl dimethyl amine oxide, preferably approximately 0.25% wt to approximately 1% wt, and more preferably approximately 0.25% wt to approximately 0.75% wt.

The disclosed formulations may optionally include a fragrance which may be used to ameliorate the smell of some of the raw materials. The fragrance may be based on natural and/or synthetic fragrances. The fragrance is most commonly mixtures or blends of a plurality of such fragrance ingredients, optionally in conjunction with a carrier such as an organic solvent or a mixture of organic solvents in which the fragrances are dissolved, suspended or dispersed. Such may be natural fragrances, e.g, natural extracts of plants, fruits, roots, stems, leaves, wood extracts, e.g. terpineols, resins, balsams, animal raw materials, e.g., civet and beaver, as well as typical synthetic perfume compounds which are frequently products of the ester, ether, aldehyde, ketone, alcohol and hydrocarbon type, e.g., benzyl acetate, linalyl acetate, citral, citronellal, methyl cedryl ketone, eugenol, isoeugenol, geraniol, linalool. Typically, mixtures of different perfume compounds are used which, together, produce an agreeable fragrance. Other suitable perfume oils are essential oils of relatively low volatility which are mostly used as aroma components. Examples are sage oil, chamomile oil, clove oil, melissa oil, mint oil, cinnamon leaf oil, lime-blossom oil, juniper berry oil, vetiver oil, olibanum oil, galbanum oil, labolanum oil and lavendin oil. When present in the disclosed formulations, the fragrance may be present in any effective amount such that it can be discerned by a consumer. However, the fragrance constituent is advantageously present in amounts of up to about 1% wt., preferably in amounts of from about 0.00001% wt. to about 0.5% wt., and most preferably in an amount of from about 0.0001% wt. to 0.5% wt based on the total weight of the formulations of which it forms a part.

A further optional constituent of the treatment formulations of the invention include colorant, such as dyes and pigments. The colorants impart a color to the formulations of which they form a part. When present, such may be included in effective amounts, advantageously from about 0.00001% wt. to about 0.5% wt., based on the total weight of the formulation of which it forms a part.

The disclosed formulations are preferably substantially free of abrasives, C1-C6 alcohols, anionic surfactants, biocides, alkali carbonates, alkali silicates, alkali phosphates, propellant, or any combination thereof. Preferably, the disclosed formulations are substantially free of biocides, such as quaternary ammonium compounds, peroxides, bleaches, and the like. Preferably, the disclosed formulations are substantially free of alkali carbonates, such as lithium carbonate, potassium carbonate, sodium carbonate. Preferably, the disclosed formulations are substantially free of alkali silicates, such as lithium silicate, potassium silicate, sodium silicate. Preferably, the disclosed formulations are substantially free of alkali phosphates, such as lithium phosphate, potassium phosphate, sodium phosphate. Preferably, the disclosed formulations are substantially free of propellant or aerosols.

The disclosed formulations may be a clear liquid or, when the optional thickener is included, a gel. The formulations may be provided as non-pressurized and pourable liquids or gels which may be dispensed with a dispensing cap, such as a hinged flip top snap lid dispensing cap or a disc top lid.

Exemplary formulations comprise a carboxylic copolymer, nonionic alkoxylated surfactant, polyetheramine, water, and an organic solvent comprisin dipropylene glycol n-propyl ether, benzyl alcohol, and alkanolamine. For example, the exemplary hard surface cleaning formulations comprise, consist essentially of, or consist of the ingredients of Table A:

TABLE A

| Ingredient | % wt | Preferable % wt | Most preferable % wt |
|---|---|---|---|
| Carboxylic copolymer | 0.25-0.75 | 0.25-0.625 | 0.25-0.5 |
| Nonionic alkoxylated surfactant | 0.075-1.33 | 0.075-0.95 | 0.075-0.6 |
| Polyetheramine | 0.004-0.4 | 0.004-0.3 | 0.004-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| Biocides | Substantially free | 0-0.05 | 0 |
| Quaternary ammonium compounds | Substantially free | 0-0.05 | 0 |
| C1-C6 alcohols | Substantially free | 0-0.05 | 0 |
| Add'l glycol ether solvents | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

Alternatively, the hard surface cleaning formulations comprise, consist essentially of, or consist of the ingredients of Table B:

TABLE B

| Ingredient | % wt | Preferable % wt | Most preferable % wt |
|---|---|---|---|
| Carboxylic copolymer | 0.25-0.75 | 0.25-0.625 | 0.25-0.5 |
| Nonionic alkoxylated surfactant | 0.075-1.33 | 0.075-0.95 | 0.075-0.6 |
| Polyetheramine | 0.004-0.4 | 0.004-0.3 | 0.004-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |

TABLE B-continued

| Ingredient | % wt | Preferable % wt | Most preferable % wt |
|---|---|---|---|
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

Preferably, the carboxylic copolymer in the tables above is anionically charged and water soluble. The anionic, water-soluble copolymer has an average molecular weight ranging from 5,000 to 15,000, preferably from 7,500 to 12,500. A particularly preferred anionic, water-soluble copolymer is sold as a 25% w/w mixture in water by Dow under the Acusol™ Pro tradename. These exemplary hard surface cleaning formulations comprise, consist essentially of, or consist of the ingredients of Table C:

TABLE C

| Ingredient | % wt | Preferable % wt | Most preferable % wt |
|---|---|---|---|
| Acusol ™ Pro | 1-3 | 1-2.5 | 1-2 |
| Nonionic alkoxylated surfactant | 0.075-1.33 | 0.075-0.95 | 0.075-0.6 |
| Polyetheramine | 0.004-0.4 | 0.004-0.3 | 0.004-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Biocides | Substantially free | 0-0.05 | 0 |
| Quaternary ammonium compounds | Substantially free | 0-0.05 | 0 |
| Anionic surfactants | Substantially free | 0-0.05 | 0 |
| Add'l glycol ether solvents | Substantially free | 0-0.05 | 0 |
| C1-C6 alcohols | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

Alternatively, the hard surface cleaning formulations comprise, consist essentially of, or consist of the ingredients of Table D:

TABLE D

| Ingredient | % wt | Preferable % wt | Most preferable % wt |
|---|---|---|---|
| Acusol ™ Pro | 1-3 | 1-2.5 | 1-2 |
| Nonionic alkoxylated surfactant | 0.075-1.33 | 0.075-0.95 | 0.075-0.6 |
| Polyetheramine | 0.004-0.4 | 0.004-0.3 | 0.004-0.2 |

TABLE D-continued

| Ingredient | % wt | Preferable % wt | Most preferable % wt |
|---|---|---|---|
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

The nonionic alkoxylated surfactant in the table above may be any C8-14 alcohol ethoxylate with 1-20 EO, preferably 2-10 EO. Exemplary alcohol ethoxylates suitable for use in the teachings herein include a branched C11 alcohol ethoxylate with 6 EO and/or a C12-15 alcohol ethoxylate with 7 EO. The branched C11 alcohol ethoxylate with 6 EO is commercially available as, amongst others, Makon™ UD-6 from Stepan. The C12-15 alcohol ethoxylate with 7 EO is commercially available as, amongst others, BioSoft™ N25-7 from Stepan.

The polyetheramine in the table above may be polyoxypropylenetriamine. The polyoxypropylenetriamine has a number-average molecular weight of 300 to 5,000 g/mol, preferably 300 to 2,000 g/mol, and more preferably 300 to 1,000 g/mol. Exemplary sources of the polyoxypropylenetriamine suitable for use in the teachings herein include Jeffamine™ T-403 sold by Huntsman. These exemplary hard surface cleaning formulations comprise, consist essentially of, or consist of the ingredients of Table E:

TABLE E

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| C8-14 alcohol ethoxylate with 1-20 EO | 0.075-1.33 | 0.075-0.95 | 0.075-0.6 |
| Polyoxypropylenetramine | 0.004-0.4 | 0.004-0.3 | 0.004-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Biocides | Substantially free | 0-0.05 | 0 |
| Quaternary ammonium compounds | Substantially free | 0-0.05 | 0 |
| Anionic surfactants | Substantially free | 0-0.05 | 0 |
| Add'l glycol ether solvents | Substantially free | 0-0.05 | 0 |
| C1-C6 alcohols | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |

TABLE E-continued

| Ingredient | % wt | Preferable % wt | Most preferable % wt |
|---|---|---|---|
| Propellant | Substantially free | 0-0.05 | 0 |
| Aerosol | Substantially free | 0-0.05 | 0 |

Alternatively, the hard surface cleaning formulations comprise, consist essentially of, or consist of the ingredients of Table F:

TABLE F

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| C8-14 alcohol ethoxylate with 1-20 EO | 0.075-1.33 | 0.075-0.95 | 0.075-0.6 |
| Polyoxypropylenetramine | 0.004-0.4 | 0.004-0.3 | 0.004-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

Stepan sells a patent pending concentrate under the tradename BioSoft™ LFS comprising 25-95% wt of a nonionic alkoxylated surfactant, preferably 80-95% wt, and 2-30% of a polyetheramine, preferably 5-20% wt. The concentrate is described in PCT Publication No WO 2020/018356, the contents of which are incorporated by reference herein in its entirety. The published patent application discloses that one embodiment of the concentrate comprises 80% wt BioSoft™ N91-6 and 20% wt Jeffamine™ T-403. Another embodiment disclosed in the published patent application comprises a siloxane ethoxylate sold as Silwet™ L-77 by Momentive Performance Materials and Jeffamine™ T-403. Another embodiment disclosed in the published patent application comprises 80 wt % of a branched C11 ethoxylate sold as Makon™ UD-6 by Stepan, 10% wt of a siloxane ethoxylate sold as Silwet™ L-77 by Momentive Performance Materials, and 10% wt of Jeffamine™ T-403. The disclosed cooktop cleaning formulations may comprise 0.3% wt to 1.4% wt, preferably 0.3% wt to 1% wt, and more preferably 0.3% wt to 0.6% of Stepan's commercially available Biosoft™ LFS product in place of the Nonionic Alkoxylated Alcohol and Polyetheramine in the tables above, preferably Biosoft™ LFS-04 and/or Biosoft™ LFS-07. These exemplary formulations comprise, consist essentially of, or consist of the ingredients of Table G:

TABLE G

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| Biosoft ™ LFS-04 and/or LFS-07 | 0.3-1.4 | 0.3-1 | 0.3-0.6 |
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |

TABLE G-continued

| Ingredient | % wt | Preferable % wt | Most preferable % wt |
|---|---|---|---|
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| Add'l glycol ether solvents | Substantially free | 0-0.05 | 0 |
| C1-C6 alcohols | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

Alternatively, these exemplary formulations comprise, consist essentially of, or consist of the ingredients of Table H:

TABLE H

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| Biosoft ™ LFS-04 and/or LFS-07 | 0.3-1.4 | 0.3-1 | 0.3-0.6 |
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| Add'l glycol ether solvents | Substantially free | 0-0.05 | 0 |
| C1-C6 alcohols | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

In another alternative, these exemplary formulations comprise, consist essentially of, or consist of the ingredients of Table I:

TABLE I

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| Biosoft ™ LFS-04 | 0.2-0.8 | 0.2-0.6 | 0.2-0.4 |
| Biosoft ™ LFS-07 | 0.1-0.6 | 0.1-0.4 | 01-0.2 |

TABLE I-continued

| Ingredient | % wt | Preferable % wt | Most preferable % wt |
|---|---|---|---|
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

In another alternative, these exemplary formulations comprise, consist essentially of, or consist of the ingredients of Table J:

TABLE J

| Ingredient | % wt | Preferable % wt | Most preferable % wt |
|---|---|---|---|
| Anionic water-soluble carboxylic copolymer | 0.25-0.75 | 0.25-0.625 | 0.25-0.5 |
| Biosoft ™ LFS-04 | 0.2-0.8 | 0.2-0.6 | 0.2-0.4 |
| Biosoft ™ LFS-07 | 0.1-0.6 | 0.1-0.4 | 01-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

In another alternative, these exemplary formulations comprise, consist essentially of, or consist of the ingredients of Table K:

TABLE K

| Ingredient | % wt | Preferable % wt | Most preferable % wt |
| --- | --- | --- | --- |
| Acusol ™ Pro | 1-3 | 1-2.5 | 1-2 |
| Biosoft ™ LFS-04 | 0.2-0.8 | 0.2-0.6 | 0.2-0.4 |
| Biosoft ™ LFS-07 | 0.1-0.6 | 0.1-0.4 | 01-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Alkanolamine | 0.975-2.5 | 0.975-2 | 0.975-1.5 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

In yet another alternative, these exemplary formulations comprise, consist essentially of, or consist of the ingredients of Table L:

TABLE L

| Ingredient | % wt | Preferable % wt | Most preferable % wt |
| --- | --- | --- | --- |
| Acusol ™ Pro | 1-3 | 1-2.5 | 1-2 |
| Biosoft ™ LFS-04 | 0.2-0.8 | 0.2-0.6 | 0.2-0.4 |
| Biosoft ™ LFS-07 | 0.1-0.6 | 0.1-0.4 | 01-0.2 |
| Dipropylene glycol n-propyl ether | 0.5-2 | 0.5-1 | 0.5-0.75 |
| Benzyl alcohol | 0.5-2 | 0.5-1 | 0.5-0.75 |
| Monoisopropanolamine | 0.475-0.5 | 0.475-0.5 | 0.475-0.5 |
| Diisopropanolamine | 0.5-2 | 0.5-1.5 | 0.5-1 |
| Water | 85-95 | 90-95 | 92-95 |
| Hydrophobically-modified alkali soluble emulsion polymer | 0-3 | 1-2 | 1.5-2 |
| Alkali hydroxide | 0-0.4 | 0.05-0.2 | 0.05-0.1 |
| C10-14 alkyl dimethyl amine oxide | 0-2 | 0.25-1 | 0.25-0.75 |
| Secondary alcohol ethoxylate | 0-2 | 0.1-1 | 0.25-0.5 |
| Anionic surfactants | Substantially free | 0-0.05 | 0 |
| C1-C6 alcohols | Substantially free | 0-0.05 | 0 |
| Add'l glycol ether solvents | Substantially free | 0-0.05 | 0 |
| Biocides | Substantially free | 0-0.05 | 0 |
| Quaternary ammonium compounds | Substantially free | 0-0.05 | 0 |
| Alkali carbonates and/or bicarbonate | Substantially free | 0-0.05 | 0 |
| Alkali silicates and/or metasilicates | Substantially free | 0-0.05 | 0 |
| Alkali phosphates | Substantially free | 0-0.05 | 0 |
| Silica | Substantially free | 0-0.05 | 0 |
| Diatomaceous earth | Substantially free | 0-0.05 | 0 |
| Propellant | Substantially free | 0-0.05 | 0 |
| Aerosol | Substantially free | 0-0.05 | 0 |

The hard surface cleaning formulations may by formed by routine mixing of measured amounts of the constituents from which they are formed. Typically, a substantial portion of the water is first provided to a suitable stirred mixing vessel. Thereafter measured amounts of the remaining constituents are added thereto, either directly or as previously prepared premixes with a further constituent or more usually an aliquot of water. The optional thickener is preferably added first. The surfactants should be added before the solvents, as the surfactants aid in solubilizing the solvents. Lastly, any high pH materials are added. The high pH materials help increase the viscosity as the optional thickener is activated at higher pH. Often any pH adjusting agent is added last before or after the addition of any final amount of water. Stirring is maintained until the formulation is homogenous.

The hard surface cleaning formulations according to the invention may be applied to oven surfaces or to other surfaces encrusted with burnt-on food residue at temperatures ranging from ambient temperature up to about 95° F. Formulations containing sodium hydroxide are preferably used at ambient temperature due to the caustic nature of sodium hydroxide. Slightly elevated temperatures, such as in the range of about 70° F. to about 90° F., may be used for formulations that do not contain sodium hydroxide. Suitable surfaces include stainless steel, polished marble, glass, cast iron, chrome, ceramic, formica, vitro ceramic, porcelain, terra cotta, concrete, enamel, black enamel, pyrolytic enamel, HDPE, acrylic, ABS, polypropylene, fiber-glass, PVC, or any combinations thereof. The disclosed formulations do not scratch any of these surfaces. The disclosed formulations should not be used on aluminum, brass, copper, galvanized steel, painted surfaces, vinyl, or any combinations thereof.

The cleaning formulation should be applied in an amount sufficient to cover the entire surface to be cleaned, or at least the locus on which burnt-on stains are present. The time required to loosen or soften the burnt-on stains sufficiently to facilitate mechanical removal depends largely upon the formulation, temperature used, residence time of the formulation, and the particular characteristics of the burnt-on stains itself. It is important to remove the softened residue by wiping with a damp clean cloth or sponge as quickly as possible in order to avoid drying of the cleaner formulation. If such drying occurs, small additional amounts of the formulation can be applied. Alternatively, the disclosed cleaning formulations may be applied directly to a clean cloth or sponge and the target area wiped. Due to the non-caustic nature of these formulations, the application and wiping may be performed without the use of personal safety equipment, such as gloves and/or goggles. In most instances, even the toughest residues are removed in a single application. One of ordinary skill in the art will recognize that burnt-on food stains are difficult to remove. As a result, the disclosed formulations may also be used to remove "lesser" stains more quickly than the burnt-on food stains disclosed herein, including simply baked- or cooked-on stains.

The inventive formulations are particularly effective in the treatment of and removal of burnt on food deposits upon surfaces commonly encountered in cooking appliances, i.e., glass, metal, and/or enameled metal surfaces.

The following examples below illustrate exemplary formulations as well as preferred embodiments of the invention. It is to be understood that these examples are provided by way of illustration only and that further formulations and articles may be produced in accordance with the teachings of the present invention.

As shown in the examples that follow, the disclosed formulations successfully remove burnt-on food in 45 to 60 seconds.

One of the principal advantages derived from this invention is that the treatment formulations provide excellent efficacy at about ambient temperature.

Surprisingly the present inventors have discovered that the disclosed formulations provide improvement in the efficacy of the treatment formulations in improving the removal of burnt-on food deposits. These formulations appear to unexpectedly facilitate the cleaning effectiveness at ambient temperature as well as up to and at slightly elevated temperatures of the further constituents making up the balance of the treatment formulations as recited herein. Thus, the use of the formulations of this invention makes possible the effective cleaning of stove tops, grills, and ovens at ambient temperature in a relatively short period of time of from about 45 seconds to about 60 seconds. Faster cleaning times may be achieved by cleaning at higher temperatures, but the elevated temperature may produce undesired fumes. As a result, cleaning at ambient temperature is preferred.

Examples

A number of test formulations were produced and are identified in Table 2 below. The formulations of Table 2 were formed from the raw materials identified in Table 1.

Additionally, to each of the formulations was included deionized water in "quantum sufficient" (q.s.) in order to provide 100 parts by weight of the specific formulation.

TABLE 1

| Abbreviation | Chemical Name | Supplier |
|---|---|---|
| BA | benzyl alcohol | ex. Aldrich Chem., or other supplier (99-100% wt.) |
| DPnP | dipropylene glycol n-propyl ether | Ex. Sold under the trademark DOWANOL ™ DPnP by DOW Chem. Co. (98-100% wt.) |
| PPh | propylene glycol n-phenyl ether | Ex. Sold under the trademark DOWANOL ™ PPh by DOW Chem. Co. (98-100% wt.) |
| MEA | monoethanolamine | ex. DOW Chem Co. (99-100% wt.), |
| MIPA | monoisopropanolamine | ex. DOW Chem Co. (99-100%) |
| DIPA | diisopropanolamine | ex. DOW Chem Co (99-100%) |
| NaOH | sodium hydroxide | ex. Aldrich Chem., or other supplier |
| LFS04 | Proprietary Nonionic Blend of alcohol ethoxylate and polyetheramine | A clear to slightly hazy liquid of a proprietary nonionic blend of alcohol ethoxylate and polyetheramine having an HLB of 12.2, ex. Stepan BioSoft ™ LFS-04 |

TABLE 1-continued

| Abbreviation | Chemical Name | Supplier |
|---|---|---|
| LFS07 | Proprietary Nonionic Blend of alcohol ethoxylate and polyetheramine | A clear liquid of a proprietary nonionic blend of alcohol ethoxylate and polyetheramine having an HLB of 11.0, ex. Stepan BioSoft™ LFS-07 |
| LO | Lauryl dimethyl amine oxide | Lauryldimethylamine oxide, ex. Stepan Ammonyx™ LO (30% in H2O) |
| F | fragrance | proprietary composition of its supplier, used "as supplied" |
| H2O | d.i. water | deionized water |
| PRO | Anionic water-soluble carboxylic copolymer | Transparent to slightly hazy yellowish liquid comprising 25% w/w of an anionic water-soluble carboxylic copolymer in water Ex Dow Acusol™ PRO |
| 820 | HASE acrylic polymer | 30% w/w dispersion of HASE acrylic polymer in water Ex Dow Acusol™ 820 |
| HW | Secondary Alcohol Ethoxylate | secondary alcohol ethoxylate having CAS number 60828-78-6 and known as 2-(2,6,8-trimethylnonan-4-yloxy)ethanol, polyethylene glycol mono(3,5-dimethyl-1-isobutylhexyl) ether, or polyethylene glycol trimethylnonyl ether Ex Dow Triton™ HW-1000 |

TABLE 2

|  | T1 (g) | T2 (g) | T3 (g) | T4 (g) | T6 (g) | T7 (g) | T8 (g) | T9 (g) |
|---|---|---|---|---|---|---|---|---|
| BA | 0 | 0 | 0.75 | 0 | 0 | 0 | 0 | 0.75 |
| DPnP | 0 | 0.75 | 0.75 | 0 | 0 | 0 | 0 | 0.75 |
| PPH | 0.75 | 0 | 0 | 0.75 | 0.75 | 0.75 | 0.75 | 0 |
| MEA | 0 | 0 | 0 | 0.475 | 0 | 0 | 0 | 0 |
| MIPA | 0.475 | 0.475 | 0.475 | 0 | 0.5 | 0 | 0.5 | 0.475 |
| DIPA | 0 | 0 | 0 | 0 | 0 | 0.5 | 1.5 | 0.5 |
| LFS04 | 0.27 | 0.27 | 0.27 | 0 | 0 | 0 | 0 | 0.27 |
| LFS07 | 0.1 | 0.1 | 0.1 | 0 | 0 | 0 | 0 | 0.09 |
| LO | 0.5 (0.15) | 0.5 (0.15) | 0.5 (0.15) | 2.1 (0.63) | 2.1 (0.63) | 2.1 (0.63) | 2.1 (0.63) | 0.4 (0.012) |
| PRO | 0 | 0 | 0 | 0 | 0 | 0 | 0 | 2 (0.5) |
| 820 | 0 | 0 | 0 | 0 | 0 | 0 | 0 | 1.75 (0.525) |
| NaOH | 0 | 0 | 0 | 0 | 0 | 0 | 0 | 0.065 |
| HW | 0 | 0 | 0 | 0 | 0 | 0 | 0 | 0.25 |
| F | 0 | 0 | 0 | 0.18 | 0.18 | 0.18 | 0.18 | 0 |
| H2O | q.s. | q.s. | q.s. | q.s. | q.s. | q.s. | q.s. | q.s. |
| Format | L | L | L | L | L | L | L | G |

Format: L = Liquid and G = Gel

The formulations were individually formed by simple mixing of measured amounts of the individual constituents into water, optionally but preferably using an automatic stirrer to ensure that the final formulation is homogenous. A preferred method of producing the formulations is as follows: to a mixing vessel containing ambient temperature deionized water, under constant stirring using a lateral and vertical stirrer with homogenization capability was added measured amounts of the raw materials in the following order:

1. Acusol™ 820
2. BioSoft™ LFS-07 and BioSoft™ LFS-04.
3. Lauryldimethylamine oxide
4. Acusol™ Pro
5. Triton™ HW-1000
6. Dipropylene glycol N-propyl ether After addition of the dipropylene glycol n-propyl ether, the mixing speed is increased. Pre-melted benzyl alcohol is added and then the mixing speed is turned to homogenization. Monoisopropanolamine is added followed by pre-melted diisopropanolamine. 90% of the formula amount of the optional sodium hydroxide is added. Mixing continues until the batch is clear and homogeneous. Quality control testing is performed to confirm the resulting formulation meets specifications. If the viscosity specification is met, no additional NaOH is added. If the viscosity specification is low and the pH specification is not exceeded, the remaining 10% NaOH is added.

Greasy Soil Removal Testing:

Formulations T1-T3 and T9 of Table 2 were tested for their efficacy in removing greasy soil from hard surfaces, representative of those as are typically encountered on stovetops and oven surfaces. The following materials and protocols were used. Cleaning results are reported on the following further tables.

Standardized Soil Preparation:

A 1 kg mixture of soil was prepared and used in the following tests. The soil was designed to mimic real-world greasy soil cooking stains. A premixture was formed which included approximately 40-45% wt oil; approximately 10-17% wt pie filling; approximately 25-35% wt fatty ground meat; approximately 1-3% wt seasoning, with the remainder deionized water. The constituents of the premixture were combined in a baking tray and baked at 400° F. (205° C.) for 2 hours. After baking, the liquid was drained and filtered through several layers of cheesecloth while still hot. The resulting filtrate should be clear and devoid of any particulate matter. The filtrate may be filtered again to obtain clarity. Commercially available unsweetened chocolate was heated and mixed with the filtrate at a weight ratio of filtrate:chocolate of approximately 8.5-9.5:1 to form the test soil used in all further testing.

Cleaning Testing:

A large number of identically sized rectangular white porcelain enamel-coated stainless steel tiles (4 inches by 8 inches) were cleaned with a light duty dishwashing detergent. The tiles were then rinsed with ethanol. The tiles were stacked in a vertical rack and allowed to air dry. Prior to the application of any formulation, the surface reflectance value "R1" for each cleaned tile was evaluated using a digital imager (such as an Ortery™ Photosimile 200 PhotoBooth device or similar). The R1 value for each tile was recorded.

A 1-1.7 gram aliquot of the test soil was applied to and evenly spread upon one surface of the tile laid upon a horizontal laboratory bench. The tiles were placed on trays and baked in a convection oven for 90 minutes at 329° F. (165° C.) to form the greasy soil test samples. Afterwards, the tiles were allowed to cool to ambient temperature for 24 hours. The test tiles were used in evaluating the cleaning performance of the test formulations T1-T3 and T9. Prior to the application of any cleaning formulation onto a tile for evaluation of its cleaning performance, the surface reflectance of each soiled tile "R2" was evaluated using the digital imager. The R2 value for each tile was recorded.

The soil removal efficacy of a formulation at ambient temperature was undertaken with the use of a Garner Straight Line Abrasion Tester. Individual cellulose sponges were washed in a washing machine and subject to three rinse cycles. Prior to testing, the sponges were wetted in water and manually squeezed to remove excess water. Thereafter a measured amount of a test formulation was applied to one surface of the damp sponge.

An aliquot of approximately 20 mL of the test formulation was applied to the sponge. A previously unused soil-coated tile having recorded R1 and R2 values was placed in the Garner Straight Line Abrasion Tester. The tile was in a horizontal orientation during application of the test formulation.

Immediately thereafter, the Garner Tester was operated to provide a sufficient number of cycles to remove 80% of the soil (each cycle being one forward and one return stroke) of the sponge. The tile was removed from the tester. The portion of the tile abraded by the sponge was rinsed gently with cool tap water for up to 5 seconds. Thereafter the tested tile was permitted to dry. The surface reflectance of the portion of the tile abraded by the sponge "R3" was evaluated using the digital imager. The R3 value for each tile was recorded. Each formulation was tested using 6 tiles, thus providing 6 replicates for each formulation being tested.

The percentage of the burnt-on greasy test soil from each tile was determined utilizing the following equation:

% soil removal=[R1-R2)/(R3-R2)]×100

The results of the testing, and the identity of the tested formulations are illustrated in Table 3. The % soil removal are also indicated. The indicated results are the numerical average of the % soil removal values for the 8 tiles used in the test.

TABLE 3

|  | T1 | T2 | T3 | T9 |
|---|---|---|---|---|
| % soil removal | 43.3 | 43.9 | 65.7 | 60* |

*tested on a different day. One of ordinary skill in the arts will also recognize that liquid formulations penetrate burnt on foods more quickly than gel formulations.

As can be understood from the results reported on Table 3, formulations containing both benzyl alcohol and dipropylene glycol n-propyl ether achieved superior % soil removal than either dipropylene glycol phenyl ether alone or dipropylene glycol n-propyl ether alone.

Additional testing was performed on samples T4-T7. The results are provided in Table 4.

TABLE 4

|  | T4 | T5 | T6 | T7 |
|---|---|---|---|---|
| % soil removal | 65 | 80 | 28 | 90 |

As seen from Table 4, the T5 and T7 formulations comprising monoisopropanolamine provide superior grease removal results compared to those containing monoethanolamine alone or diisopropanolamine alone.

Burnt-On Food Removal Testing:

Formulation T9 of Table 2 was tested for its efficacy in removing burnt-on soil from hard surfaces, representative of those as are typically encountered on stovetops and oven surfaces. The following materials and protocols were used. Cleaning results are reported on the following further tables.

Cleaning Testing:

Black vitro-ceramic glass tiles were tested to mimic real-life stove tops found in consumer homes. A large number of identically sized rectangular black vitro-ceramic glass tiles were cleaned with a light duty dishwashing detergent. The tiles were then rinsed with water and dried with a paper towel. The tiles were then rinsed with acetone and stacked in a vertical rack to air dry for a minimum of 30 minutes at ambient temperature. Prior to the application of any formulations, the surface reflectance value "R3" for each cleaned tile was evaluated using a digital imager (such as an Ortery™ Photosimile 200 PhotoBooth device or similar). The R3 value for each tile was recorded.

Due to the contrast between the stain and the tile, burnt gravy was tested. 7.5 g of boiling gravy was applied to some of the tiles using a 1-inch paint brush or basting brush. The gravy tiles were allowed to dry completely—typically 12 hours or overnight. The gravy tiles were then placed in a 200° C. oven for 15 minutes. The tiles were removed from the oven and allowed to cool for 30 minutes. The surface reflectance value "R2" for each soiled tile was evaluated using a digital imager and recorded.

The soil removal efficacy of the formulations at ambient temperature was undertaken with the use of a Garner Straight Line Abrasion Tester. Individual cellulose sponges were washed in a washing machine and subject to three rinse cycles. Prior to testing, the sponges were wetted in water and manually squeezed to remove excess water.

An aliquot of approximately 5 g of test formulation T9 from Table 2 was applied directly to the tile. A previously unused soil-coated tile having recorded R3 and R2 values was placed in the Garner Straight Line Abrasion Tester. The tile was in a horizontal orientation during application of the test formulation.

Immediately thereafter, the Garner Tester was operated to provide a sufficient number of cycles to remove 80% of the soil (each cycle being one forward and one return stroke) of the sponge. The tile was removed from the tester. The portion of the tile abraded by the sponge was rinsed gently with cool tap water for up to 5 seconds. Thereafter the tested tile was permitted to dry in an upright position. The surface reflectance of the portion of the tile abraded by the sponge "R1" was evaluated using the digital imager. The R1 value for each tile was recorded. The burnt-on gravy stain was tested using 8 tiles, thus providing 8 replicates for each formulation being tested.

The percentage of the burnt-on greasy test soil from each tile was determined utilizing the following equation:

% gravy soil removal=[R1-R2)/(R3-R2)]×100

The average % gravy soil removal for the 8 tiles was 78%.

Stability:

Formulation T9 of Table 2 was tested for stability. The formulation was stored in a 16 oz HDPE bottle with a HDPE closure. The stability was quantified by observing color, odor, appearance, viscosity, & pH at key conditions. The results are provided in Table 6.

TABLE 6

| Time and Condition | Color & Appearance | Odor | pH | Viscosity (cps) |
|---|---|---|---|---|
| Initial | Clear, Viscous Gel | Slight Alcoholic Smell | 10.72 | 678 |
| 2 weeks at −10° C. | Pass | Pass | 10.7 | 592 |
| 4.5° C. | | | | |
| 2 weeks | Pass | Pass | 10.62 | 597 |
| 4 weeks | Pass | Pass | 10.56 | 725 |
| 6 weeks | Pass | Pass | 10.56 | 562 |
| 12 weeks | Pass | Pass | 10.57 | 571 |
| 26 weeks | Pass | Pass | 10.69 | 877 |
| 52 weeks | Pass | Pass | 10.58 | 784 |
| 25° C. and 50% RH | | | | |
| 2 weeks | Pass | Pass | 10.63 | 597 |
| 4 weeks | Pass | Pass | 10.53 | 683 |
| 6 weeks | Pass | Pass | 10.44 | 597 |
| 12 weeks | Pass | Pass | 10.52 | 566 |
| 26 weeks | Pass | Pass | 10.50 | 861 |
| 52 weeks | Pass | Pass | 10.46 | 828 |
| 40° C. and 75% RH | | | | |
| 2 weeks | Pass | Pass | 10.62 | 640 |
| 4 weeks | Pass | Pass | 10.42 | 683 |
| 6 weeks | Pass | Pass | 10.37 | 604 |
| 12 weeks | Pass | Pass | 10.34 | 578 |
| 26 weeks | Pass | Pass | 10.49 | 859 |
| 50° C. | | | | |
| 2 weeks | Pass | Pass | 10.46 | 597 |
| 4 weeks at 50° C. | Pass | Pass | 10.51 | 725 |
| 6 weeks at 50° C. | Pass | Pass | 10.39 | 621 |

The results of Table 6 demonstrate formulation T9 would be stable on the shelf for 3 years in World Zones I-IV, and maybe longer. According to the International Council on Harmonization, Zone I is temperate; Zone II is Mediterranean/subtropical; Zone III is hot and dry; and Zone IV is hot and humid tropical.

Surface Scratching:

The impact of the formulation T9 from Table 2 was compared to two commercially available surface cleaners having formulations C1 and C2 in Table 7, as provided on their websites. Formulation C1 is advertised as being non-abrasive, no scratch and safe for use on glass and ceramic cooktops. Formulation C2 is advertised as being "no scratch" and "great for all surfaces," including metal and stainless steel. Equivalent amounts of the products were applied individually to an aluminum tile and a stainless steel tile divided into 4 sections. T9 was applied to one section of the tile, C1 to another section, C2 to another section, and the 4$^{th}$ section was maintained as a control, with nothing applied. As paper towels are known to have the ability to scratch surfaces, the formulations were wiped from the tiles with a wet Kimwipe delicate task wiper sold by KimTech, making sure to only wipe the relevant section. The tiles were then wiped with a dry Kimwipe, again making sure to only wipe the relevant section. The tiles were viewed for scratches under a microscope at 20× amplification. Formulation T9 did not provide any additional scratches in the stainless steel and aluminum tiles. Numerous visual scratches were evident from C1 and C2 on the stainless steel tiles. C1 and C2 produced texture changes in the aluminum tiles. These results demonstrate that the addition of abrasives to a formulation negatively impacts many common kitchen surfaces, even when the products are advertised as no-scratch. Applicant believes that a formulation with no abrasives and low levels organic solvents that removes burnt on food without requiring use of gloves is novel.

TABLE 7

| Ingredient | C1 | C2 |
|---|---|---|
| Water | ✓ | X |
| Mineral Abrasive | ✓ | X |
| Surfactant Blend | ✓ | X |
| Dimethicone | ✓ | X |
| Bentonite | ✓ | X |
| Plastic Abrasive | ✓ | X |
| Disodium Citrate | ✓ | X |
| Xantham Gum | ✓ | X |
| Polyalkylene Glycol | ✓ | X |
| Sodium Phosphate Monobasic | ✓ | X |
| Citric Acid | ✓ | X |
| Allyl Heptanoate | ✓ | X |
| Quartz | ✓ | X |
| Methylchloroisothiazolinone | ✓ | X |
| Methylisothiazolinone | ✓ | X |
| Dye | X | ✓ |
| Soap | X | ✓ |
| Quartz | X | ✓ |
| Sodium Silicate | X | ✓ |
| Fragrance | X | ✓ |

Below are non-limiting examples of additional claims that may be pursued in non-provisional applications that claim benefit of this application:

1. A non-caustic cleaning formulation comprising a carboxylic copolymer; a nonionic alkoxylated surfactant; a polyetheramine; water; and an organic solvent comprising an alkanolamine, dipropylene glycol n-propyl ether, and benzyl alcohol.
2. The formulation of claim 1, wherein the formulation comprises approximately 0.25% wt to approximately 0.75% wt carboxylic copolymer.
3. The formulation of claim 1 or claim 2, wherein the formulation comprises approximately 0.25% wt to approximately 0.625% wt carboxylic copolymer.
4. The formulation of any of the preceding claims, wherein the formulation comprises approximately 0.25% wt to approximately 0.5% wt carboxylic copolymer.
5. The formulation of any of the preceding claims, wherein the carboxylic copolymer is an anionic, water-soluble carboxylic copolymer.
6. The formulation of any of the preceding claims, wherein the anionic, water-soluble carboxylic copolymer has an average molecular weight ranging from 5,000 to 15,000.
7. The formulation of any of the preceding claims, where the anionic, water-soluble carboxylic copolymer has an average molecular weight ranging from 7,500 to 12,500.

8. The formulation of any of the preceding claims, wherein the anionic, water-soluble carboxylic copolymer is commercially available as approximately 25% w/w mixture in water from Dow under the trade name Acusol™ Pro.

9. The formulation of any of the preceding claims, wherein Acusol™ Pro from Dow comprises approximately 25% w/w of the anionic, water-soluble carboxylic copolymer in water.

10. The formulation of any of the preceding claims, wherein the formulation comprises approximately 1% wt to approximately 3% wt of the 25% w/w mixture of the anionic, water-soluble carboxylic copolymer in water sold by Dow under the trade name Acusol™ Pro.

11. The formulation of any of the preceding claims, wherein the formulation comprises approximately 1% wt to approximately 2.5% wt of the 25% w/w mixture of the anionic, water-soluble carboxylic copolymer in water sold by Dow under the trade name Acusol™ Pro.

12. The formulation of any of the preceding claims, wherein the formulation comprises approximately 1% wt to approximately 2% wt of the 25% w/w mixture of the anionic, water-soluble carboxylic copolymer in water sold by Dow under the trade name Acusol™ Pro.

13. The formulation of any of the preceding claims, wherein the formulation comprises approximately 0.075% wt to approximately 1.33% wt nonionic alkoxylated surfactant.

14. The formulation of any of the preceding claims, wherein the formulation comprises approximately 0.075% wt to approximately 0.95% wt nonionic alkoxylated surfactant.

15. The formulation of any of the preceding claims, wherein the formulation comprises approximately 0.075% wt to approximately 0.6% wt nonionic alkoxylated surfactant.

16. The formulation of any of the preceding claims, wherein the formulation comprises approximately 0.075% wt to approximately 1.33% wt linear alcohol alkoxylate.

17. The formulation of any of the preceding claims, wherein the formulation comprises approximately 0.075% wt to approximately 0.95% wt linear alcohol alkoxylate.

18. The formulation of any of the preceding claims, wherein the formulation comprises approximately 0.075% wt to approximately 0.6% wt linear alcohol alkoxylate.

19. The formulation of any of the preceding claims, wherein the formulation comprises approximately 0.075% wt to approximately 1.33% wt branched alcohol alkoxylate.

20. The formulation of any of the preceding claims, wherein the formulation comprises approximately 0.075% wt to approximately 0.95% wt branched alcohol alkoxylate.

21. The formulation of any of the preceding claims, wherein the formulation comprises approximately 0.075% wt to approximately 0.6% wt branched alcohol alkoxylate.

22. The formulation of any of the preceding claims, wherein the linear alcohol alkoxylate is a C8-14 linear alcohol ethoxylate with 1-20 EO.

23. The formulation of any of the preceding claims, wherein the linear alcohol alkoxylate is a C8-14 linear alcohol ethoxylate with 2-10 EO.

24. The formulation of any of the preceding claims, wherein the linear alcohol alkoxylate is a C9-11 branched alcohol ethoxylate with 5-7 EO.

25. The formulation of any of the preceding claims, wherein the linear alcohol alkoxylate is a C12-15 linear alcohol ethoxylate with 6-8 EO.

26. The formulation of any of the preceding claims, wherein the linear alcohol alkoxylate comprises a C12-15 linear alcohol ethoxylate with 6-8 EO and a C9-11 branched alcohol ethoxylate with 5-7 EO.

27. The formulation of any of the preceding claims, wherein the branched alcohol alkoxylate is a C11 branched alcohol ethoxylate with 5-7 EO sold by Stepan under the tradename Makon™ UD-6.

28. The formulation of any of the preceding claims, wherein the linear alcohol alkoxylate is a C12-15 linear alcohol ethoxylate with 6-8 EO sold by Stepan under the tradename BioSoft™ N25-7.

29. The formulation of any of the preceding claims, wherein the linear alcohol alkoxylate comprises a C11 branched alcohol ethoxylate with 5-7 EO sold by Stepan under the tradename Makon™ UD-6 from Stepan and a C12-15 linear alcohol ethoxylate with 6-8 EO sold by Stepan under the tradename BioSoft™ N25-7.

30. The formulation of any of the preceding claims, wherein the formulation comprises approximately 0.004% wt to approximately 0.4% wt polyetheramine.

31. The formulation of any of the preceding claims, wherein the formulation comprises approximately 0.004% wt to approximately 0.3% wt polyetheramine.

32. The formulation of any of the preceding claims, wherein the formulation comprises approximately 0.004% wt to approximately 0.2% wt polyetheramine.

33. The formulation of any of the preceding claims, wherein the polyetheramine comprises at least one primary amino group.

34. The formulation of any of the preceding claims, wherein the polyetheramine has a number average molecular weight within the range of 300 to 5,000 g/mol and at least 50 mole % of oxypropylene unites, oxybutylene units, or both.

35. The formulation of any of the preceding claims, wherein the polyetheramine comprises polyoxypropylenetriamine.

36. The formulation of any of the preceding claims, wherein the polyoxypropylenetriamine has a number-average molecular weight of 300 to 2,000 g/mol.

37. The formulation of any of the preceding claims, wherein the polyoxypropylenetriamine has a number-average molecular weight of 300 to 1,000 g/mol.

38. The formulation of any of the preceding claims, wherein the polyoxypropylenetriamine is sold by Huntsman under the tradename Jeffamine™ T-403.

39. The formulation of any of the preceding claims, wherein a combination of the nonionic alkoxylated surfactant and polyetheramine is commercially available from Stepan under the trade name BioSoft™ LFS.

40. The formulation of any of the preceding claims, wherein the BioSoft™ LFS combination comprises 25-95% wt nonionic alkoxylated surfactant and 2-30% wt polyetheramine.

41. The formulation of any of the preceding claims, wherein the BioSoft™ LFS combination comprises 80-95% wt nonionic alkoxylated surfactant and 5-20% wt polyetheramine.

42. The formulation of any of the preceding claims, wherein the formulation comprises approximately 0.3% wt to approximately 1.4% wt of the combination of the nonionic alkoxylated surfactant and polyetheramine sold by Stepan under the tradename BioSoft™ LFS.
43. The formulation of any of the preceding claims, wherein the formulation comprises approximately 0.3% wt to approximately 1% wt of the combination of the nonionic alkoxylated surfactant and polyetheramine sold by Stepan under the tradename BioSoft™ LFS.
44. The formulation of any of the preceding claims, wherein the formulation comprises approximately 0.3% wt to approximately 0.6% wt of the combination of the nonionic alkoxylated surfactant and polyetheramine sold by Stepan under the tradename BioSoft™ LFS.
45. The formulation of any of the preceding claims, wherein the formulation comprises approximately 0.2% wt to approximately 0.8% wt of the combination of the nonionic alkoxylated surfactant and polyetheramine sold by Stepan under the tradename BioSoft™ LFS-04.
46. The formulation of any of the preceding claims, wherein the formulation comprises approximately 0.2% wt to approximately 0.6% wt of the combination of the nonionic alkoxylated surfactant and polyetheramine sold by Stepan under the tradename BioSoft™ LFS-04.
47. The formulation of any of the preceding claims, wherein the formulation comprises approximately 0.2% wt to approximately 0.4% wt of the combination of the nonionic alkoxylated surfactant and polyetheramine sold by Stepan under the tradename BioSoft™ LFS-04.
48. The formulation of any of the preceding claims, wherein the formulation comprises approximately 0.1% wt to approximately 0.6% wt of the combination of the nonionic alkoxylated surfactant and polyetheramine sold by Stepan under the tradename BioSoft™ LFS-07.
49. The formulation of any of the preceding claims, wherein the formulation comprises approximately 0.1% wt to approximately 0.4% wt of the combination of the nonionic alkoxylated surfactant and polyetheramine sold by Stepan under the tradename BioSoft™ LFS-07.
50. The formulation of any of the preceding claims, wherein the formulation comprises approximately 0.1% wt to approximately 0.2% wt of the combination of the nonionic alkoxylated surfactant and polyetheramine sold by Stepan under the tradename BioSoft™ LFS-07.
51. The formulation of any of the preceding claims, wherein the formulation comprises approximately 0.2% wt to approximately 0.8% wt of the combination of the nonionic alkoxylated surfactant and polyetheramine sold by Stepan under the tradename BioSoft™ LFS-04 and approximately 0.1% wt to approximately 0.6% wt of the combination of the nonionic alkoxylated surfactant and polyetheramine sold by Stepan under the tradename BioSoft™ LFS-07.
52. The formulation of any of the preceding claims, wherein the formulation comprises approximately 0.2% wt to approximately 0.6% wt of the combination of the nonionic alkoxylated surfactant and polyetheramine sold by Stepan under the tradename BioSoft™ LFS-04 and approximately 0.1% wt to approximately 0.4% wt of the combination of the nonionic alkoxylated surfactant and polyetheramine sold by Stepan under the tradename BioSoft™ LFS-07.
53. The formulation of any of the preceding claims, wherein the formulation comprises approximately 0.2% wt to approximately 0.4% wt of the combination of the nonionic alkoxylated surfactant and polyetheramine sold by Stepan under the tradename BioSoft™ LFS-04 and approximately 0.1% wt to approximately 0.2% wt of the combination of the nonionic alkoxylated surfactant and polyetheramine sold by Stepan under the tradename BioSoft™ LFS-07.
54. The formulation of any of the preceding claims, wherein the formulation comprises approximately 2% wt to approximately 6.5% wt of the organic solvent.
55. The formulation of any of the preceding claims, wherein the formulation comprises approximately 2% wt to approximately 5% wt of the organic solvent.
56. The formulation of any of the preceding claims, wherein the formulation comprises approximately 2% wt to approximately 4% wt of the organic solvent.
57. The formulation of any of the preceding claims, wherein the formulation comprises approximately 2% wt to approximately 3% wt of the organic solvent.
58. The formulation of any of the preceding claims, wherein the formulation comprises approximately 2.25% wt to approximately 2.75% wt of the organic solvent.
59. The formulation of any of the preceding claims, wherein the formulation comprises approximately 0.5% wt to approximately 2% wt dipropylene glycol n-propyl ether.
60. The formulation of any of the preceding claims, wherein the formulation comprises approximately 0.5% wt to approximately 1% wt dipropylene glycol n-propyl ether.
61. The formulation of any of the preceding claims, wherein the formulation comprises approximately 0.5% wt to approximately 0.75% wt dipropylene glycol n-propyl ether.
62. The formulation of any of the preceding claims, wherein the formulation comprises approximately 0.5% wt to approximately 2% wt benzyl alcohol.
63. The formulation of any of the preceding claims, wherein the formulation comprises approximately 0.5% wt to approximately 1% wt benzyl alcohol.
64. The formulation of any of the preceding claims, wherein the formulation comprises approximately 0.5% wt to approximately 0.75% wt benzyl alcohol.
65. The formulation of any of the preceding claims, wherein the formulation comprises approximately 0.975% wt to approximately 2.5% wt alkanolamine.
66. The formulation of any of the preceding claims, wherein the formulation comprises approximately 0.975% wt to approximately 2% wt alkanolamine.
67. The formulation of any of the preceding claims, wherein the formulation comprises approximately 0.975% wt to approximately 1.5% wt alkanolamine.
68. The formulation of any of the preceding claims, wherein the alkanolamine comprises monoisopropanolamine.
69. The formulation of any of the preceding claims, wherein the alkanolamine further comprises diisopropanolamine.

70. The formulation of any of the preceding claims, wherein the formulation comprises approximately 0.475% wt to approximately 0.5% wt monoisopropanolamine.
71. The formulation of any of the preceding claims, wherein the formulation comprises approximately 0.5% wt to approximately 2% wt diisopropanolamine.
72. The formulation of any of the preceding claims, wherein the formulation comprises approximately 0.5% wt to approximately 1.5% wt diisopropanolamine.
73. The formulation of any of the preceding claims, wherein the formulation comprises approximately 0.5% wt to approximately 1% wt diisopropanolamine.
74. The formulation of any of the preceding claims, wherein the formulation comprises approximately 0.475% wt to approximately 0.5% wt monoisopropanolamine and approximately wt to approximately 2% wt diisopropanolamine.
75. The formulation of any of the preceding claims, wherein the formulation comprises approximately 0.475% wt to approximately 0.5% wt monoisopropanolamine and approximately 0.5% wt to approximately 1.5% wt diisopropanolamine.
76. The formulation of any of the preceding claims, wherein the formulation comprises approximately 0.475% wt to approximately 0.5% wt monoisopropanolamine and approximately wt to approximately 1% wt diisopropanolamine.
77. The formulation of any of the preceding claims, wherein the formulation comprises approximately 0.5% wt to approximately 2% wt dipropylene glycol n-propyl ether, approximately 0.5% wt to approximately 2% wt benzyl alcohol, and approximately 0.975% wt to approximately 2.5% wt alkanolamine.
78. The formulation of any of the preceding claims, wherein the formulation comprises approximately 0.5% wt to approximately 1% wt dipropylene glycol n-propyl ether, approximately 0.5% wt to approximately 1% wt benzyl alcohol, and approximately 0.975% wt to approximately 2% wt alkanolamine.
79. The formulation of any of the preceding claims, wherein the formulation comprises approximately 0.5% wt to approximately 0.75% wt dipropylene glycol n-propyl ether, approximately 0.5% wt to approximately 0.75% wt benzyl alcohol, and approximately 0.975% wt to approximately 1.5% wt alkanolamine.
80 The formulation of any of the preceding claims, wherein the formulation comprises approximately 0.5% wt to approximately 2% wt dipropylene glycol n-propyl ether, approximately 0.5% wt to approximately 2% wt benzyl alcohol, approximately 0.475% wt to approximately 0.5% wt monoisopropanolamine, and approximately 0.5% wt to approximately 2% wt diisopropanolamine.
81. The formulation of any of the preceding claims, wherein the formulation comprises approximately 0.5% wt to approximately 1% wt dipropylene glycol n-propyl ether, approximately 0.5% wt to approximately 1% wt benzyl alcohol, approximately 0.475% wt to approximately 0.5% wt monoisopropanolamine, and approximately 0.5% wt to approximately 1.5% wt diisopropanolamine.
82. The formulation of any of the preceding claims, wherein the formulation comprises approximately 0.5% wt to approximately 0.75% wt dipropylene glycol n-propyl ether, approximately 0.5% wt to approximately 0.75% wt benzyl alcohol, approximately 0.475% wt to approximately 0.5% wt monoisopropanolamine, and approximately 0.5% wt to approximately 1% wt diisopropanolamine.
83. The formulation of any of the preceding claims, wherein the formulation comprises approximately 85% wt to approximately 95% wt water.
84. The formulation of any of the preceding claims, wherein the formulation comprises approximately 90% wt to approximately 95% wt water.
85. The formulation of any of the preceding claims, wherein the formulation comprises approximately 92% wt to approximately 95% wt water.
86. The formulation of any of the preceding claims, wherein the water is soft water.
87. The formulation of any of the preceding claims, wherein the soft water contains less than 17 parts per million (ppm) calcium.
88. The formulation of any of the preceding claims, wherein the soft water contains less than 17 ppm magnesium.
89. The formulation of any of the preceding claims, wherein the formulation further comprises a thickener.
90. The formulation of any of the preceding claims, wherein the thickener is a polymer or polysaccharide.
91. The formulation of any of the preceding claims, wherein the polysaccharide is a galactomannan.
92. The formulation of any of the preceding claims, wherein the polysaccharide is guar gum.
93. The formulation of any of the preceding claims, wherein the polysaccharide is xantham gum.
94. The formulation of any of the preceding claims, wherein the formulation comprises approximately 0% wt to approximately 0.9% wt polymer.
95. The formulation of any of the preceding claims, wherein the formulation comprises approximately 0.3% wt to approximately 0.6% wt polymer.
96. The formulation of any of the preceding claims, wherein the formulation comprises approximately 0.45% wt to approximately 0.6% wt polymer.
97. The formulation of any of the preceding claims, wherein the polymer has a molecular weight of approximately 50,000 g/mol to approximately 500,000 g/mol.
98. The formulation of any of the preceding claims, wherein the polymer has a molecular weight of approximately 80,000 g/mol to approximately 400,000 g/mol.
99. The formulation of any of the preceding claims, wherein the polymer has a molecular weight of approximately 100,000 g/mol to approximately 300,000 g/mol.
100. The formulation of any of the preceding claims, wherein the polymer is an acrylic polymer.
101. The formulation of any of the preceding claims, wherein the formulation comprises approximately 0% wt to approximately 0.9% wt acrylic polymer.
102. The formulation of any of the preceding claims, wherein the formulation comprises approximately 0.3% wt to approximately 0.6% wt acrylic polymer.
103. The formulation of any of the preceding claims, wherein the formulation comprises approximately 0.45% wt to approximately 0.6% wt acrylic polymer.
104. The formulation of any of the preceding claims, wherein the acrylic polymer has a molecular weight of approximately 50,000 g/mol to approximately 500,000 g/mol.

105. The formulation of any of the preceding claims, wherein the acrylic polymer hays a molecular weight of approximately 80,000 g/mol to approximately 400,000 g/mol.
106. The formulation of any of the preceding claims, wherein the acrylic polymer has a molecular weight of approximately 100,000 g/mol to approximately 300,000 g/mol.
107. The formulation of any of the preceding claims, wherein the polymer is an anionic copolymer based on ethyl acrylate and acrylic acid.
108. The formulation of any of the preceding claims, wherein the formulation comprises approximately 0% wt to approximately 0.9% wt of the anionic copolymer.
109. The formulation of any of the preceding claims, wherein the formulation comprises approximately 0.3% wt to approximately 0.6% wt of the anionic copolymer.
110. The formulation of any of the preceding claims, wherein the formulation comprises approximately 0.45% wt to approximately 0.6% wt of the anionic copolymer.
111. The formulation of any of the preceding claims, wherein the anionic copolymer has a molecular weight of approximately 50,000 g/mol to approximately 500,000 g/mol.
112. The formulation of any of the preceding claims, wherein the anionic copolymer has a molecular weight of approximately 80,000 g/mol to approximately 400,000 g/mol.
113. The formulation of any of the preceding claims, wherein the anionic copolymer has a molecular weight of approximately 100,000 g/mol to approximately 300,000 g/mol.
114. The formulation of any of the preceding claims, wherein the polymer is a Hydrophobically-modified Alkali Soluble Emulsion (HASE) polymer.
115. The formulation of any of the preceding claims, wherein the formulation comprises approximately 0% wt to approximately 0.9% wt HASE polymer.
116. The formulation of any of the preceding claims, wherein the formulation comprises approximately 0.3% wt to approximately 0.6% wt HASE polymer.
117. The formulation of any of the preceding claims, wherein the formulation comprises approximately 0.45% wt to approximately 0.6% wt HASE polymer.
118. The formulation of any of the preceding claims, wherein the HASE polymer has a molecular weight of approximately 50,000 g/mol to approximately 500,000 g/mol.
119. The formulation of any of the preceding claims, wherein the HASE polymer has a molecular weight of approximately 80,000 g/mol to approximately 400,000 g/mol.
120. The formulation of any of the preceding claims, wherein the HASE polymer having a molecular weight of approximately 100,000 g/mol to approximately 300,000 g/mol.
121. The formulation of any of the preceding claims, wherein the formulation comprises approximately 0% wt to approximately 0.9% wt HASE acrylic polymer.
122. The formulation of any of the preceding claims, wherein the formulation comprises approximately 0.3% wt to approximately 0.6% wt HASE acrylic polymer.
123. The formulation of any of the preceding claims, wherein the formulation comprises approximately 0.45% wt to approximately 0.6% wt HASE acrylic polymer.
124. The formulation of any of the preceding claims, wherein the HASE acrylic polymer has the following structure:

$$\begin{array}{c}\text{structure with repeating units } w, x, y, z \text{ having } -C(O)OR^3, -C(O)OH, -C(O)OH, -C(O)OR^2 \text{ groups and } R, R^1 \text{ substituents}\end{array}$$

wherein each of R, $R^1$, and $R^3$ is independently H or a $C_1$-$C_6$ alkyl group; $R^2$ is a hydrophobic group, such as a $C_4$-$C_{24}$ alkyl group; and w, x, y, and z are each independently non-zero numbers.
125. The formulation of claim 124, wherein each of R, R1, and R3 is independently selected from H or a C1 to C2 alkyl group.
126. The formulation of claim 124 or 125, wherein R1 is methyl.
127. The formulation of claim 124 or 125, wherein R3 is ethyl.
128. The formulation of any one of claims 124 to 127, wherein R2 is a C8 to C20 alkyl group.
129. The formulation of any of claims 124 to 128, wherein R2 further comprises alkoxylate (AO) units.
130. The formulation of claim 129, wherein R2 comprises approximately 1 to approximately AO units.
131. The formulation of claim 129 or 130, wherein R2 comprises approximately 10 to approximately 50 AO units.
132. The formulation of any one of claims 129 to 131, wherein the AO units are ethoxy units (EO), propoxy units (PO), butoxy units (BO), or any combinations thereof.
133. The formulation of any one of claims 129 to 132, wherein the AO units are EO, PO, or any combinations thereof.
134. The formulation of any one of claims 129 to 133, wherein the AO units are EO.
135. The formulation of claim 134, wherein R2 comprises approximately 1 to approximately 60 EO units.
136. The formulation of claim 134 or 135, wherein R2 comprises approximately 10 to approximately 50 EO units.
137. The formulation of any one of claims 129 to 136, wherein the ratio of w:x is from 1:20 to 20:1.
138. The formulation of any one of claims 129 to 137, wherein the ratio of w:x is from 1:10 to 10:1.
139. The formulation of any one of claims 129 to 138, wherein the ratio of w:x is from 1:5 to 5:1.
140. The formulation of any one of claims 129 to 139, wherein the ratio of w:y is from 1:20 to 20:1.
141. The formulation of any one of claims 129 to 140, wherein the ratio of w:y is from 1:10 to 10:1.
142. The formulation of any one of claims 129 to 141, wherein the ratio of w:y is from 1:5 to 5:1.
143. The formulation of any one of claims 129 to 142, wherein the ratio of w:z is from 1:1 to 500:1.
144. The formulation of any one of claims 129 to 143, wherein the ratio of w:z is from 2:1 to 250:1.

145. The formulation of any one of claims 129 to 144, wherein the ratio of w:z is from 25:1 to 75:1.

146. The formulation of any of the preceding claims, wherein the HASE acrylic polymer has a molecular weight of approximately 50,000 g/mol to approximately 500,000 g/mol.

147. The formulation of any of the preceding claims, wherein the HASE acrylic polymer has a molecular weight of approximately 80,000 g/mol to approximately 400,000 g/mol.

148. The formulation of any of the preceding claims, wherein the HASE acrylic polymer has a molecular weight of approximately 100,000 g/mol to approximately 300,000 g/mol.

149. The formulation of any of the preceding claims, wherein the HASE acrylic polymer is commercially available as approximately 30-31% w/w dispersions in water from Dow under the trade names Acusol™ 820, Acusol™ 823, Acusol™ Millennium ER, or combinations thereof.

150. The formulation of any of the preceding claims, wherein the HASE acrylic polymer is commercially available as approximately 30% w/w dispersion in water from Dow under the trade names Acusol™ 820.

151. The formulation of any of the preceding claims, wherein the HASE acrylic polymer is commercially available as approximately 30% w/w dispersion in water from Dow under the trade names Acusol™ 823.

152. The formulation of any of the preceding claims, wherein the HASE acrylic polymer is commercially available as approximately 31% w/w dispersion in water from Dow under the trade names Acusol™ Millennium ER.

153. The formulation of any of the preceding claims, wherein the formulation comprises approximately 0% wt to approximately 3% wt of the 30-31% w/w dispersion of the HASE acrylic polymer in water sold by Dow under the trade names Acusol™ 820, Acusol™ 823, Acusol™ Millennium ER, or combinations thereof.

154. The formulation of any of the preceding claims, wherein the formulation comprises approximately 1% wt to approximately 2% wt of the 30-31% w/w dispersion of the HASE acrylic polymer in water sold by Dow under the trade names Acusol™ 820, Acusol™ 823, Acusol™ Millennium ER, or combinations thereof.

155. The formulation of any of the preceding claims, wherein the formulation comprises approximately 1.5% wt to approximately 2% wt of the 30-31% w/w dispersion of the HASE acrylic polymer in water sold by Dow under the trade names Acusol™ 820, Acusol™ 823, Acusol™ Millennium ER, or combinations thereof.

156. The formulation of any of the preceding claims, wherein the formulation comprises approximately 0% wt to approximately 3% wt of the 30% w/w dispersion of the HASE acrylic polymer in water sold by Dow under the trade name Acusol™ 820.

157. The formulation of any of the preceding claims, wherein the formulation comprises approximately 1% wt to approximately 2% wt of the 30% w/w dispersion of the HASE acrylic polymer in water sold by Dow under the trade name Acusol™ 820.

158. The formulation of any of the preceding claims, wherein the formulation comprises approximately 1.5% wt to approximately 2% wt of the 30% w/w dispersion of the HASE acrylic polymer in water sold by Dow under the trade name Acusol™ 820.

159. The formulation of any of the preceding claims, wherein the formulation comprises approximately 0% wt to approximately 3% wt of the 30% w/w dispersion of the HASE acrylic polymer in water sold by Dow under the trade name Acusol™ 823.

160. The formulation of any of the preceding claims, wherein the formulation comprising approximately 1% wt to approximately 2% wt of the 30-31% w/w dispersion of the HASE acrylic polymer in water sold by Dow under the trade name Acusol™ 823.

161. The formulation of any of the preceding claims, wherein the formulation comprises approximately 1.5% wt to approximately 2% wt of the 30% w/w dispersion of the HASE acrylic polymer in water sold by Dow under the trade name Acusol™ 823.

162. The formulation of any of the preceding claims, wherein the formulation comprises approximately 0% wt to approximately 3% wt of the 31% w/w dispersion of the HASE acrylic polymer in water sold by Dow under the trade name Acusol™ Millennium ER.

163. The formulation of any of the preceding claims, wherein the formulation comprises approximately 1% wt to approximately 2% wt of the 31% w/w dispersion of the HASE acrylic polymer in water sold by Dow under the trade name Acusol™ Millennium ER.

164. The formulation of any of the preceding claims, wherein the formulation comprises approximately 1.5% wt to approximately 2% wt of the 31% w/w dispersion of the HASE acrylic polymer in water sold by Dow under the trade name Acusol™ Millennium ER.

165. The formulation of any of the preceding claims, wherein the formulation comprises approximately 0% wt to approximately 0.4% wt alkali hydroxide.

166. The formulation of any of the preceding claims, wherein the formulation comprises approximately 0.05% wt to approximately 0.2% wt alkali hydroxide.

167. The formulation of any of the preceding claims, wherein the formulation comprises approximately 0.05% wt to approximately 0.1% wt alkali hydroxide.

168. The formulation of any of the preceding claims, wherein the formulation comprises approximately 0% wt to approximately 0.4% wt sodium hydroxide.

169. The formulation of any of the preceding claims, wherein the formulation comprises approximately 0.05% wt to approximately 0.2% wt sodium hydroxide.

170. The formulation of any of the preceding claims, wherein the formulation comprises approximately 0.05% wt to approximately 0.1% wt sodium hydroxide.

171. The formulation of any of the preceding claims, wherein the formulation comprises approximately 0% wt to approximately 2% wt of a linear C10-C14 alkyl dimethyl amine oxide.

172. The formulation of any of the preceding claims, wherein the formulation comprises approximately 0.25% wt to approximately 1% wt of a linear C10-C14 alkyl dimethyl amine oxide.

173. The formulation of any of the preceding claims, wherein the formulation comprises approximately 0.25% wt to approximately 0.75% wt of a linear C10-C14 alkyl dimethyl amine oxide.

174. The formulation of any of the preceding claims, wherein the formulation comprises approximately 0% wt to approximately 2% wt of lauryldimethyl amine oxide.

175. The formulation of any of the preceding claims, wherein the formulation comprises approximately 0.25% wt to approximately 1% wt of lauryldimethyl amine oxide.
176. The formulation of any of the preceding claims, wherein the formulation comprises approximately 0.25% wt to approximately 0.75% wt of lauryldimethyl amine oxide.
177. The formulation of any of the preceding claims, wherein the formulation further comprises a wetting agent.
178. The formulation of any of the preceding claims, wherein the wetting agent is a secondary alcohol ethoxylate or a polyether-modified polysiloxane.
179. The formulation of any of the preceding claims, wherein the formulation comprises approximately 0% wt to approximately 2% wt of a secondary alcohol ethoxylate.
180. The formulation of any of the preceding claims, wherein the formulation comprises approximately 0.1% wt to approximately 1% wt of a secondary alcohol ethoxylate.
181. The formulation of any of the preceding claims, wherein the formulation comprises approximately 0.25% wt to approximately 0.5% wt of a secondary alcohol ethoxylate.
182. The formulation of any of the preceding claims, wherein the formulation comprises approximately 0% wt to approximately 2% wt of the secondary alcohol ethoxylate sold by Dow under the trade name Triton™ HW-1000.
183. The formulation of any of the preceding claims, wherein the formulation comprises approximately 0.1% wt to approximately 1% wt of the secondary alcohol ethoxylate sold by Dow under the trade name Triton™ HW-1000.
184. The formulation of any of the preceding claims, wherein the formulation comprises approximately 0.25% wt to approximately 0.5% wt of the secondary alcohol ethoxylate sold by Dow under the trade name Triton™ HW-1000.
185. The formulation of any of the preceding claims, wherein the formulation comprises approximately 0% wt to approximately 2% wt of a secondary alcohol ethoxylate having the CAS No 60828-78-6.
186. The formulation of any of the preceding claims, wherein the formulation comprises approximately 0.1% wt to approximately 1% wt of a secondary alcohol ethoxylate having the CAS No 60828-78-6.
187. The formulation of any of the preceding claims, wherein the formulation comprises approximately 0.25% wt to approximately 0.5% wt of a secondary alcohol ethoxylate having the CAS No 60828-78-6.
188. The formulation of any of the preceding claims, wherein the formulation comprises approximately 0% wt to approximately 2% wt of polyethylene glycol mono(3,5-dimethyl-1-isobutylhexyl) ether.
189. The formulation of any of the preceding claims, wherein the formulation comprises approximately 0.1% wt to approximately 1% wt of polyethylene glycol mono(3,5-dimethyl-1-isobutylhexyl) ether.
190. The formulation of any of the preceding claims, wherein the formulation comprises approximately 0.25% wt to approximately 0.5% wt of polyethylene glycol mono(3,5-dimethyl-1-isobutylhexyl) ether.
191. The formulation of any of the preceding claims, wherein the non-caustic cooktop cleaning formulations is substantially free of abrasive material, such as silica, sodium metasilicate, sodium silicate, sodium bicarbonate, diatomaceous earth, or any combinations thereof.
192. The formulation of any of the preceding claims, wherein the non-caustic cooktop cleaning formulations is substantially free of biocides.
193. The formulation of any of the preceding claims, wherein the non-caustic cooktop cleaning formulations is substantially free of quaternary ammonium compounds.
194. The formulation of any of the preceding claims, wherein the non-caustic cooktop cleaning formulations is substantially free of alkali carbonates, such as lithium carbonate, potassium carbonate, sodium carbonate.
195. The formulation of any of the preceding claims, wherein the non-caustic cooktop cleaning formulations is substantially free of alkali silicates, such as lithium silicate, potassium silicate, sodium silicate.
196. The formulation of any of the preceding claims, wherein the non-caustic cooktop cleaning formulations is substantially free of alkali phosphates, such as lithium phosphate, potassium phosphate, sodium phosphate.
197. The formulation of any of the preceding claims, wherein the non-caustic cooktop cleaning formulations is substantially free of monoethanolamine.
198. The formulation of any of the preceding claims, wherein the non-caustic cooktop cleaning formulations is substantially free of propellant.
199. The formulation of any of the preceding claims, wherein the non-caustic cooktop cleaning formulations is substantially free of aerosol.
200. The formulation of any of the preceding claims, wherein the non-caustic cooktop cleaning formulations is substantially free of anionic surfactants.
201. The formulation of any of the preceding claims, wherein the non-caustic cooktop cleaning formulations is substantially free of glycol ethers, with the exception of dipropylene glycol n-propyl ether.
202. The formulation of any of the preceding claims, wherein the non-caustic cooktop cleaning formulations is substantially free of organic acids, such as citric acid, lactic acid, malic acid, formic acid, or any combinations thereof.
203. The formulation of any of the preceding claims, wherein the non-caustic cooktop cleaning formulations is substantially free of C1-C6 alcohols, such as ethanol, propanol, butanol, etc.
204. The formulation of any of the preceding claims, wherein the non-caustic cooktop cleaning formulations is substantially free of sequestrants, such as nitriloatriaceetic acid (NTA), dicarboxymethyl glutamic acid tetrasodium salt (GLDA), ethylene diamine tetraacetic acid (EDTA), alkali metal gluconates, or combinations thereof.
205. The formulation of any of the preceding claims, wherein the formulation is a liquid.
206. The formulation of any of the preceding claims, wherein the formulation is a gel.
207. A method of cleaning a cooktop, the method comprising applying the formulation of any one of claims 1 to 206 to the surface of a stove, oven, grill, or combinations thereof.
208. The method of claim 207, wherein the surface is at or close to ambient temperature.

209. The method of claim 207 or 208, further comprising leaving the formulation on the surface for approximately 45 to approximately 90 seconds.
210. The method of claim 207, further comprising wiping the formulation from the surface using a damp towel or cloth.
211. The method of any one of claims 207 to 210, wherein the formulation is applied without the use of gloves.
212. The method of any one of claims 207 to 211, wherein no gloves are required during the applying and wiping steps.
213. The method of any one of claims 207 to 212, wherein the surface is ceramic glass, stainless steel, porcelain, cast iron, or any combination thereof.
214. The method of claim 213, wherein the formulation does not scratch the surface when the surface is viewed under a microscope at 20× amplification.

The foregoing description of various aspects of the invention has been presented for purposes of illustration and description. Embodiments and/or features therein may be freely combined with one another. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A non-caustic cleaning formulation comprising a carboxylic copolymer; a nonionic alkoxylated surfactant; a polyetheramine; water; and an organic solvent comprising an alkanolamine, dipropylene glycol n-propyl ether, and benzyl alcohol.
2. The non-caustic cleaning formulation of claim 1, wherein the carboxylic copolymer is an anionic, water-soluble carboxylic copolymer having an average molecular weight ranging from to 15,000 and the formulation comprises approximately 0.25% wt to approximately 0.75% wt of the anionic, water-soluble carboxylic copolymer.
3. The non-caustic cleaning formulation of claim 1, wherein the nonionic alkoxylated surfactant is C8-14 linear and/or branched alcohol ethoxylate with 1-20 EO and the formulation comprises approximately 0.075% wt to approximately 1.33% wt of the nonionic alkoxylated surfactant.
4. The non-caustic cleaning formulation of claim 1, wherein the polyetheramine is polyoxypropylenetriamine and the formulation comprises approximately 0.004% wt to approximately 0.4% wt polyetheramine.
5. The non-caustic cleaning formulation of claim 1, wherein a combination of the nonionic alkoxylated surfactant and the polyetheramine is commercially available from Stepan under the trade name BioSoft™ LFS and the formulation comprises approximately 0.3% wt to approximately 1.4% wt of the combination.
6. The non-caustic cleaning formulation of claim 1, wherein the formulation comprises approximately 2% wt to approximately 6% wt of the organic solvent.
7. The non-caustic cleaning formulation of claim 6, wherein the formulation comprises approximately 0.975% wt to approximately 2.5% wt alkanolamine.
8. The non-caustic cleaning formulation of claim 7, wherein the formulation comprises approximately 0.475% wt to approximately 0.5% wt monoisopropanolamine and approximately wt to approximately 2% wt diisopropanolamine.
9. The non-caustic cleaning formulation of claim 6, wherein the formulation comprises approximately 0.5% wt to approximately 2% wt dipropylene glycol n-propyl ether.
10. The non-caustic cleaning formulation of claim 6, wherein the formulation comprises approximately 0.5% wt to approximately 2% wt benzyl alcohol.
11. The non-caustic cleaning formulation of claim 1, wherein the formulation further comprises a thickener selected from a polymer or polysaccharide.
12. The non-caustic cleaning formulation of claim 1, wherein the formulation further comprises a wetting agent selected from a secondary alcohol ethoxylate or a polyether-modified polysiloxane.
13. The non-caustic cleaning formulation of claim 1, wherein the formulation is substantially free of C1-C6 alcohols; anionic surfactants; biocides; abrasives, such as diatomaceous earth, alkali metasilicates, alkali silicates, alkali carbonates, alkali bicarbonates, silica, or combinations thereof; alkali phosphates; propellant; or any combination thereof.
14. A method of cleaning a cooktop, the method comprising applying the formulation of claim 1 to the surface of a stove, oven, grill, or any combination thereof.
15. The method of claim 14, wherein the surface is at or close to ambient temperature.
16. The method of claim 15, further comprising leaving the formulation on the surface for approximately 45 to approximately 60 seconds.
17. The method of claim 16, further comprising wiping the formulation from the surface using a damp towel or cloth.
18. The method of claim 14, wherein the formulation is applied without the use of gloves.
19. The method of claim 14, wherein the surface is ceramic glass, stainless steel, porcelain, cast iron, or any combination thereof.
20. The method of claim 19, wherein the formulation does not scratch the surface.

* * * * *